(12) United States Patent
Farmer et al.

(10) Patent No.: US 11,891,567 B2
(45) Date of Patent: *Feb. 6, 2024

(54) COMPOSITIONS AND METHODS FOR PARAFFIN LIQUEFACTION AND ENHANCED OIL RECOVERY IN OIL WELLS AND ASSOCIATED EQUIPMENT

(71) Applicant: Locus Solutions IPCo, LLC, Solon, OH (US)

(72) Inventors: Sean Farmer, Ft. Lauderdale, FL (US); Ken Alibek, Solon, OH (US); Tyler Dixon, Madison, OH (US); Karthik N. Karathur, Solon, OH (US)

(73) Assignee: Locus Solutions IPCo, LLC, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,902

(22) Filed: Jul. 30, 2022

(65) Prior Publication Data
US 2022/0372364 A1 Nov. 24, 2022

Related U.S. Application Data

(63) Continuation of application No. 17/052,181, filed as application No. PCT/US2019/029870 on Apr. 30, 2019, now Pat. No. 11,434,415.
(Continued)

(51) Int. Cl.
*C09K 8/584* (2006.01)
*C09K 8/582* (2006.01)
*E21B 43/16* (2006.01)

(52) U.S. Cl.
CPC ............. *C09K 8/584* (2013.01); *C09K 8/582* (2013.01); *E21B 43/16* (2013.01); *C09K 2208/32* (2013.01)

(58) Field of Classification Search
None
See application file for complete search history.

(56) References Cited

U.S. PATENT DOCUMENTS 3,191,676 A 6/1965 Froning
3,581,824 A 6/1971 Hurd
(Continued)

FOREIGN PATENT DOCUMENTS

CN 102352227 A 2/2012
CN 102399547 A 4/2012
(Continued)

OTHER PUBLICATIONS

Amani, H., et al., "Comparative study of biosurfactant producing bacteria in MEOR applications." Journal of Petroleum Science and Engineering, 2010, 75: 209-214.
(Continued)

*Primary Examiner* — John J Figueroa
(74) *Attorney, Agent, or Firm* — SALIWANCHIK, LLOYD & EISENSCHENK

(57) ABSTRACT

The subject invention provides compositions comprising solvents and surfactants, as well as their use in improving oil and/or gas production. In some embodiments, the compositions comprise chemical or synthetic solvents and/or surfactants. In other embodiments, the compositions comprise biological components, such as microorganisms and/or their growth by-products. The subject invention can be used to dissolve, disperse and/or emulsify paraffin precipitates and/or deposits; prevent and/or inhibit paraffin deposition; remove rust deposits and prevent corrosion associated therewith; inhibit bacterial growth and/or biofilm formation; and to enhance oil recovery.

16 Claims, 14 Drawing Sheets

Related U.S. Application Data

(60) Provisional application No. 62/664,613, filed on Apr. 30, 2018, provisional application No. 62/682,462, filed on Jun. 8, 2018, provisional application No. 62/691,098, filed on Jun. 28, 2018, provisional application No. 62/719,734, filed on Aug. 20, 2018, provisional application No. 62/743,815, filed on Oct. 10, 2018, provisional application No. 62/805,539, filed on Feb. 14, 2019.

(56) References Cited

U.S. PATENT DOCUMENTS

| | | | |
|---|---|---|---|
| 3,871,956 | A | 3/1975 | Azarowics |
| 4,369,125 | A | 1/1983 | Kragen et al. |
| 4,450,908 | A | 5/1984 | Hitzman |
| 4,487,262 | A | 12/1984 | Venkatesan et al. |
| 4,522,261 | A | 6/1985 | McInerney et al. |
| 4,561,501 | A | 12/1985 | Shaw et al. |
| 4,793,826 | A | 12/1988 | Hayes et al. |
| 4,905,761 | A | 3/1990 | Bryant |
| 5,152,907 | A | 10/1992 | Dulaney et al. |
| 5,156,652 | A | 10/1992 | Gregoli et al. |
| 5,165,477 | A | 11/1992 | Shell et al. |
| 5,284,576 | A | 2/1994 | Weers et al. |
| 5,869,325 | A | 2/1999 | Crabtree et al. |
| 6,033,901 | A | 3/2000 | Powell, Jr. |
| 6,942,037 | B1 | 9/2005 | Arnold et al. |
| 7,216,705 | B2 | 5/2007 | Saini et al. |
| 7,472,747 | B1 | 1/2009 | Brigmon et al. |
| 7,677,673 | B2 | 3/2010 | Tranquilla et al. |
| 7,681,638 | B2 | 3/2010 | Soni et al. |
| 8,188,012 | B2 | 5/2012 | Weerasooriya et al. |
| 8,316,933 | B2 | 11/2012 | Kohr |
| 9,422,470 | B2 | 8/2016 | Xu et al. |
| 9,441,115 | B2 | 9/2016 | Wu et al. |
| 9,550,937 | B2 | 1/2017 | Campbell et al. |
| 9,683,164 | B2 | 6/2017 | Gunawan et al. |
| 9,725,986 | B2 | 8/2017 | Xu et al. |
| 9,884,986 | B2 | 2/2018 | Gunawan et al. |
| 10,023,787 | B2 | 7/2018 | Benoit et al. |
| 10,190,038 | B2 | 1/2019 | Armstrong et al. |
| 11,434,415 | B2* | 9/2022 | Farmer ............ C09K 8/524 |
| 11,447,684 | B2* | 9/2022 | Farmer ............ E21B 37/06 |
| 2001/0056047 | A1 | 12/2001 | Meine et al. |
| 2004/0171512 | A1 | 9/2004 | Furuta et al. |
| 2004/0231845 | A1 | 11/2004 | Cooke, Jr. |
| 2006/0219409 | A1 | 10/2006 | Dyer |
| 2007/0092930 | A1 | 4/2007 | Lal et al. |
| 2007/0125536 | A1 | 6/2007 | Acock et al. |
| 2007/0151726 | A1 | 7/2007 | Crews et al. |
| 2008/0139412 | A1 | 6/2008 | Fuller |
| 2008/0167445 | A1 | 7/2008 | Podella et al. |
| 2008/0280789 | A1 | 11/2008 | Welton et al. |
| 2008/0302531 | A1 | 12/2008 | Berger et al. |
| 2009/0029879 | A1 | 1/2009 | Soni et al. |
| 2009/0313772 | A1* | 12/2009 | Talley ............ E21B 21/068 507/90 |
| 2010/0044031 | A1 | 2/2010 | Fallon et al. |
| 2010/0163230 | A1 | 7/2010 | Kotlar |
| 2011/0139262 | A1 | 6/2011 | Aburto Anell et al. |
| 2011/0290482 | A1 | 12/2011 | Weerasooriya et al. |
| 2012/0037368 | A1 | 2/2012 | Eick et al. |
| 2012/0055685 | A1 | 3/2012 | Sanders et al. |
| 2012/0122740 | A1 | 5/2012 | Roldan Carrillo et al. |
| 2012/0213759 | A1* | 8/2012 | Karsten ............ C11D 1/62 424/94.1 |
| 2012/0247763 | A1 | 10/2012 | Rakitsky |
| 2012/0292022 | A1 | 11/2012 | Choban et al. |
| 2013/0020082 | A1 | 1/2013 | Lumsden |
| 2013/0048282 | A1 | 2/2013 | Adams |
| 2013/0062053 | A1 | 3/2013 | Kohr et al. |
| 2013/0264060 | A1 | 10/2013 | De Wolf et al. |
| 2013/0319656 | A1 | 12/2013 | Brownlee |
| 2014/0073541 | A1 | 3/2014 | Ravikiran et al. |
| 2014/0256600 | A1 | 9/2014 | Dillon et al. |
| 2014/0273150 | A1 | 9/2014 | Angel |
| 2014/0305649 | A1 | 10/2014 | Tang et al. |
| 2014/0315765 | A1 | 10/2014 | McDaniel |
| 2014/0323757 | A1 | 10/2014 | Kim |
| 2014/0332212 | A1 | 11/2014 | Ayers et al. |
| 2014/0360727 | A1 | 12/2014 | Milam et al. |
| 2015/0037302 | A1 | 2/2015 | Bralkowski et al. |
| 2015/0068950 | A1 | 3/2015 | See et al. |
| 2015/0259642 | A1 | 9/2015 | Sangwai et al. |
| 2015/0300139 | A1* | 10/2015 | Armstrong ............ C09K 8/685 166/305.1 |
| 2016/0002521 | A1* | 1/2016 | Dillon ............ C09K 8/08 507/201 |
| 2016/0145487 | A1 | 5/2016 | Alam et al. |
| 2016/0160111 | A1 | 6/2016 | Smith et al. |
| 2016/0222280 | A1 | 8/2016 | Kohr et al. |
| 2016/0244347 | A1 | 8/2016 | Angel |
| 2016/0251565 | A1 | 9/2016 | Yanagisawa et al. |
| 2016/0333258 | A1 | 11/2016 | Drake et al. |
| 2017/0037301 | A1 | 2/2017 | Alwattari |
| 2017/0138135 | A1 | 5/2017 | Almutairi |
| 2017/0226398 | A1 | 8/2017 | Shimaoka |
| 2018/0201531 | A1 | 7/2018 | Cohen et al. |
| 2018/0282608 | A1 | 10/2018 | Gopal et al. |
| 2019/0218499 | A1 | 7/2019 | Farmer et al. |
| 2019/0292436 | A1 | 9/2019 | Mason et al. |
| 2019/0309208 | A1 | 10/2019 | Giorno et al. |
| 2019/0359562 | A1 | 11/2019 | Lyman et al. |
| 2020/0071600 | A1* | 3/2020 | Farmer ............ C09K 8/588 |

FOREIGN PATENT DOCUMENTS

| | | |
|---|---|---|
| CN | 102925397 A | 2/2013 |
| CN | 103449696 A | 12/2013 |
| CN | 104109646 B | 10/2014 |
| CN | 104974952 A | 10/2015 |
| CN | 103614131 A | 1/2016 |
| CN | 105753283 A | 7/2016 |
| CN | 108373912 A | 8/2018 |
| GB | 2450204 A | 12/2008 |
| JP | 2010200695 A | 9/2010 |
| JP | 2016000017 A | 1/2016 |
| KR | 101481459 B1 | 1/2015 |
| WO | 2007129332 A1 | 11/2007 |
| WO | 2010111226 A2 | 9/2010 |
| WO | 2011008570 A2 | 1/2011 |
| WO | 2013110132 A1 | 8/2013 |
| WO | 2013157921 A1 | 10/2013 |
| WO | 2014152350 A1 | 9/2014 |
| WO | 2015093934 A1 | 6/2015 |
| WO | 2015167864 A1 | 11/2015 |
| WO | 2016196680 A1 | 12/2016 |
| WO | 2017040903 A1 | 3/2017 |
| WO | 2017044953 A1 | 3/2017 |
| WO | 2018049182 A2 | 3/2018 |
| WO | 2018107162 A1 | 6/2018 |
| WO | 2018129299 A1 | 7/2018 |
| WO | 2018148265 A2 | 8/2018 |
| WO | 2018148397 A2 | 8/2018 |
| WO | 2018160995 A1 | 9/2018 |
| WO | 2018191172 A1 | 10/2018 |
| WO | 2018231791 A1 | 12/2018 |
| WO | 2018237137 A1 | 12/2018 |
| WO | 2019022996 A1 | 1/2019 |
| WO | 2019022998 A1 | 1/2019 |
| WO | 2019046183 A1 | 3/2019 |
| WO | 2019067356 A1 | 4/2019 |
| WO | 2019089730 A1 | 5/2019 |
| WO | 2019094615 A1 | 5/2019 |
| WO | 2019133555 A1 | 7/2019 |
| WO | 2019191296 A1 | 10/2019 |
| WO | 2019200054 A1 | 10/2019 |
| WO | 2019204715 A1 | 10/2019 |

(56) References Cited

FOREIGN PATENT DOCUMENTS

| WO | 2019222168 A1 | 11/2019 |
| WO | 2020006194 A1 | 1/2020 |

OTHER PUBLICATIONS

Amosa, M.K., et al., "Sulphide Scavengers in Oil and Gas Industry—A Review." NAFTA, 2010, 61(2): 85-92.

Castaneda, L.C., et al., "Current situation of emerging technologies for upgrading of heavy oils." Catalysis Today, 2014, 220-222: 248-273.

Das, N., et al., "Review Article Microbial Degradation of Petroleum Hydrocarbon Contaminants: An Overview." Biotechnology Research International, 2011, 2011: 941810: 1-13.

Daverey, A., et al., "Production of sophorolipids by the yeast *Candida bombicola* using simple and low cost fermentative media." Food Research International, 2009, 42: 499-504.

De Almeida, D., et al., "Biosurfactants: Promising Molecules for Petroleum Biotechnology Advances." Frontiers in Microbiology, Oct. 2016, 7(1718): 1-14.

De Brito, D., Biosurfactants from renewable raw materials, Universidade do Minho Departamento de Engenharia Biologica, Nov. 2013: 1-93.

De Oliveira, M., et al., "Review: Sophorolipids A Promising Biosurfactant and it's Applications." International Journal of Advanced Biotechnology and Research, 2015, 6(2): 161-174.

Elshafie, A. E., et al., "Sophorolipids Production by Candida bombicola ATCC 22214 and its Potential Application in Microbial Enhanced Oil Recovery." Frontiers in Microbiology, Nov. 2015, 6(1324): 1-11.

El-Sheshtawy, H.S., et al., "Production of biosurfactants by Bacillus licheniformis and Candida albicans for application in microbial enhanced oil recovery." Egyptian Journal of Petroleum, 2016, 25: 293-298.

Ghojavand, H. et al., "Isolation of thermotolerant, halotolerant, facultative biosurfactant-producing bacteria." Appl. Microbiol. Biotechnol, Oct. 2008, 80(6): Abstract, doi: 10,1007/s00253-008-1570-7.

Gudina, E., et al., "Biosurfactant-producing and oil-degrading Bacillus subtilis strains enhance oil recovery in laboratory sand-pack columns." Journal of Hazardous Materials, 2013, 261: 106-113.

Ines, M., et al., "Glycolipids biosurfactants; potential related biomedical and biotechnical applications." Carbohydrate Research, 2015, 416: 59-69.

Kaur, K., et al., "Biosurfactant production by yeasts isolated from hydrocarbon polluted environments." Environ Monit Assess, 2017, 189 (603: 1-13.

Kurtzman, C.P., et al., "Production of sophorolipid biosurfactants by multiple species of the Starmerella (*Candida*) bombicolayeast clade." FEMS Microbiol Lett, 2010, 311: 140-146.

Liu, X., et al., "Recovery of crude oil from oily sludge in an oilfield by sophorolipid." Petroleum Science and Technology, 2019, 37(13): 1582-1588.

Ma, X., et al., "Surface and biological activity of sophorolipid molecules produced by *Wickerhamiella domercqiae* var. *sophorolipid* CGMCC 1576." Journal of Colloid and Interface Science, 2012, 376: 165-172.

Morikawa, M., "Beneficial Biofilm Formation by Industrial Bacteria *Bacillus subtilis* and Related Species." Journal of Bioscience and Bioengineering, 2006, 101(1): 1-8.

Nur, H.A., et al., "*Saccharomyces cerevisiae* from Baker's Yeast for Lower Oil Viscosity and Beneficial Metabolite to Improve Oil Recovery: An Overview." Applied Mechanics and Materials, 2014, 625: 522-525.

Pacwa-Plociniczak, M. et al., "Review: Environmental Applications of Biosurfactants: Recent Advances." Int. J. Mol. Sci., 2011, 12: 633-654.

Rocha E Silva, F.C.P., et al., "Yeasts and bacterial biosurfactants as demulsifiers for petroleum derivative in seawater emulsions." AMB Expr., 2007, 7(202): 1-13.

Santos, D.K.F., et al., "Biosurfactants: Multifunctional Biomolecules of the 21st Century." International Journal of Molecular Sciences, 2016, 17(401): 1-31.

Sen, R., "Biosurfactants: Advances in Experimental Medicine and Biology." Landes Bioscience and Springer Science+Business Media, LLC, 2010, 672: 1-331.

Shah, M.U.H., et al., "Production of sophorolipids by *Starmerella bombicola* yeast using new hydrophobic substrates." Biochemical Engineering Journal, 2017, 127: 60-67.

Silva, R., et al., "Applications of Biosurfactants in the Petroleum Industry and the Remediation of Oil Spills." International Journal of Molecular Sciences, 2014, 15: 12523-12542.

Thaniyavarn, J., et al., "Production of Sophorolipid Biosurfactant by Pichia anomala." Bioscience, Biotechnology, and Biochemistry, 2008, 72(8): 2061-2068.

Umar, Z.D., et al., "Rapid biodegradation of polycyclic aromatic hydrocarbons (PAHs) using effective Cronobacter sakazakii MM045 (KT933253)." MethodsX, 2017, 4: 104-117.

Wadekar, S., et al., "Sophorolipid Production by Starmerella bombicola (ATCC 22214) from Virgin and Waste Frying Oils, and the Effects of Activated Earth Treatment of the Waste Oils." J Am Oil Chem Soc, 2012, 89: 1029-1039.

Youssef, N., et al., "In Situ Biosurfactant Production by Bacillus Strains Injected into a Limestone Petroleum Reservoir." Applied and Environmental Microbiology, Feb. 2007, 73(4): 1239-1247.

Zafra, G., et al., "Biodegradation of polycyclic aromatic hydrocarbons by *Trichoderma* species: a mini review." Environ Sci Pollut Res, 2015, 22: 19426-19433.

\* cited by examiner

COMPOSITIONS AND METHODS FOR PARAFFIN LIQUEFACTION AND ENHANCED OIL RECOVERY IN OIL WELLS AND ASSOCIATED EQUIPMENT

CROSS-REFERENCE TO RELATED APPLICATIONS

This application is a continuation of U.S. patent application Ser. No. 17/052,181, filed Oct. 31, 2020; which is a National Stage Application of International Application No. PCT/US2019/029870, filed Apr. 30, 2020; which claims priority to U.S. Provisional Patent Application Ser. No. 62/664,613, filed Apr. 30, 2018; Ser. No. 62/682,462, filed Jun. 8, 2018; Ser. No. 62/691,098, filed Jun. 28, 2018; Ser. No. 62/719,734, filed Aug. 20, 2018; Ser. No. 62/743,815, filed Oct. 10, 2018; and Ser. No. 62/805,539, filed Feb. 14, 2019; each of which are incorporated by reference herein in their entireties.

BACKGROUND OF THE INVENTION

The safe and efficient production of hydrocarbon compositions depends on the proper functioning of hydrocarbon-producing facilities. One of the most common issues leading to structural failure and production inefficiency is the formation of deposits in and around the wellbore, tubing, flow lines, storage tanks, separators, and other components of oil and gas production infrastructure, as well as in the pores of the reservoir rock.

These problematic deposits can be formed by, for example, high-molecular-weight constituents of petroleum fluids, most notably, paraffins and asphaltenes, as well as bacterial deposits, often in the form of biofilms.

Paraffin deposits, in particular, can range from soft accumulations of lighter-molecular-weight paraffins to hard and/or brittle accumulations as the molecular weight of the paraffin increases. Paraffin deposition is primarily a result of a loss in solubility of certain components in the crude oil, which can be caused by a decrease in temperature or pressure in an oil well or formation.

Temperature decrease can be caused by, for example, expansion of gas through perforations and from the lifting of fluids to the earth surface; radiation of heat from tubing into the surrounding formation; intrusion of water into or around the wellbore; vaporization-induced loss of lighter constituents in the crude oil; and/or recovery and transport of oil during winter months or in climates that are cold year-round. Additionally, in offshore operations, decrease in temperature can occur when crude oil enters subsea pipelines, which can have temperatures as low as 4° C.

Along with temperature decrease, pressure decrease can impact the composition of crude oil, which causes loss of volatiles and induces precipitation of paraffins. For this reason, mature oil wells commonly experience paraffin deposition issues. As the production time of a well continues and lighter components of crude oil are depleted, leaving behind heavier fractions, reservoir pressure and flow rate of oil decrease. Furthermore, films and chemicals build up with time in the pores of the shale, reducing hydrocarbon movement into the wellbore. This can lead to changes in temperature and/or pressure gradients and thus greater paraffin accumulation.

The "pour point" and the "cloud point" are two physical properties of liquid fuels that can also contribute to the precipitation of dissolved solids such as paraffins in crude fluids, as well as the ability of crude fluids to flow through pipelines and tubulars. Cloud point (or, Wax Appearance Temperature) is the temperature at which a cloud of wax crystals first appear in a liquid fuel. Above the cloud point, dissolved solids present in the crude remain soluble, but below the cloud point, they start to precipitate and create a cloudy appearance. This is an indicator of how well the fuel will perform under cold weather conditions, because, not only can wax clog equipment, but it can also deposit onto pipelines and other equipment surfaces.

Pour point is the lowest temperature at which the flow or movement of oil, i.e., the ability of the oil to be pumped, is still possible. Below this temperature, the crude stops flowing and starts to crystallize and/or freeze. Highly paraffinic crude oils have higher pour point values.

Paraffin that remains entrained in crude oil does not typically cause issues in production. It is when the paraffin particles precipitate and begin to accumulate as solid or semi-solid deposits that the most significant problems related to paraffin occur. The presence of water on the formation pore walls or on tubing inner surfaces, as well as the quality and smoothness of pipes can inhibit deposition; however rusty pipes with rough surfaces will encourage deposition. Thus, upkeep of equipment surfaces is important for prevention of paraffin depositions. Furthermore, minimizing the cooling of the crude oil as it is brought to the surface, using, for example specially designed pumping wells and tubing can aide in prevention of paraffin depositions.

Paraffin inhibitor chemicals, which are a class of compounds that typically consist of crystal modifiers that prevent the deposition of paraffin onto surfaces, can also be used. These surface-active materials inhibit the adhesion of paraffin to sites on, e.g., the tubing walls; however, the efficacy of any given inhibitor chemical depends upon the specific composition of the crude oil within the well, which can be highly variable depending on, for example, the geographical location. Other methods of inhibition, involving plastic coatings on tubulars, and electrical heaters, can be extremely costly, and thus are limited.

Once even a thin layer of paraffin deposit is formed on a surface, the rate of further accumulation drastically increases. Thus, systematic treatment or removal of deposits is crucial to maintaining properly functioning oil producing facilities. As the thickness of deposits increases over time, the result is a gradual decrease in production. In tubing and casing structures, the deposits begin to reduce the inner diameter of piping and restrict the free flow of oil and gas. As this occurs, the interior roughness of the structures also increases, which raises the pump pressure required to move the petroleum product. If left untreated, deposits can ultimately lead to complete blockage. Furthermore, depending upon the location of the precipitation, maintenance and/or emergency repairs can become extremely expensive.

Current methods of deposit removal fall within four main categories: mechanical, chemical, microbial, and thermal removal. Mechanical removal typically involves the use of scrapers or cutters to physically remove deposits. For example, in tanks where precipitation has occurred, the sides of the tank must be cut out and force, e.g., a sledgehammer, is then used to remove the deposits. For pipelines, complete replacement of pipes is often required if deposits become too thick for manual or mechanical removal.

Chemical removal involves the use of solvents or surfactants that can solubilize deposits or interfere with their crystallization and formation. Examples of widely-used solvents include benzene, toluene and xylene. With microbial methods, certain strains of bacteria can be used to degrade deposits themselves, or can produce natural biochemicals that do so.

Along with many of these methods, however, thorough removal of deposits often requires the addition of some type of thermal treatment. Thermal removal, with steam, hot water or hot oil, for example, is useful for melting or dissolving deposits, and as noted, for supplementing other methods of removal. This requires high energy inputs, however, and the use of hot steam can be dangerous for workers at the site of application. Furthermore, the liquefaction of paraffin is often only temporary, meaning the paraffin will almost immediately re-solidify due to the properties of the oil and/or the environment. This is a particular problem with highly-paraffinic crudes, e.g., those recovered from Utah formations, and could also become a problem in Permian formations when temperatures drop during the winter.

Biofilms can also build up in various structures and processing mechanisms, including shale formation facing, wells, pipes, and tanks. "Biofilm" comprises layers of biomass made up of a compact grouping of microorganisms surrounded by an extracellular matrix of polymeric substances. Biofilms adhere to surfaces of many man-made mechanisms, such as tubes and pipes, and can significantly impair their proper functioning. Additionally, many of the biofilms present in, or on, oil rigs contain sulfate-reducing bacteria that generate potent chemical byproducts, e.g., hydrogen sulfide. Hydrogen sulfide gas is harmful for drill workers who might breathe it. Furthermore, hydrogen sulfide can cause corrosion of various mechanisms within an oil producing structure (known as "microbial induced corrosion" or "MIC") and can cause the souring of oil during storage or transport. Sour oil contains a high sulfur content, which increases costs for producers and consumers due to the increase of time and resources required for processing the oil.

Accumulation of organic deposits in and on oil processing equipment and in the pores of oil-bearing formations can have a compounding effect. Unless these organic compounds are removed, operators can be faced with lowering yields, improper function of pumps, corroded or blocked tubing and pipes, and potential for total loss of production. Furthermore, cost, safety in processing, large-scale sustainability, and damage to formations must be accounted for when developing methods for removing these deposits to ensure long-term efficiency of hydrocarbon production.

Because of the importance of safe and efficient oil and gas production and the difficulties caused by paraffin deposits in production and transport of oil and gas, there is a continuing need for improved methods of removing these deposits from oil-bearing formations and associated production equipment.

BRIEF SUMMARY OF THE INVENTION

The subject invention provides compositions and methods for improving oil well performance by removing paraffin deposits from oil- and/or natural gas-bearing formations, and/or the wells and production equipment associated therewith, as well as for enhancing oil recovery.

In certain embodiments, materials and methods are provided for improving oil and/or gas production by liquefying or dissolving solid paraffin deposits and dispersing and/or emulsifying precipitated paraffin back into crude oil. Advantageously, in one embodiment, the paraffin remains dispersed in the oil after treatment and does not re-precipitate.

In preferred embodiments, the subject invention provides a composition for improving oil and/or gas production, the composition comprising one or more solvents and one or more surfactants.

In certain embodiments, the composition comprises one or more solvents, one or more surfactants, one or more yeast fermentation products, one or more chelating agent(s), and, optionally, one or more ammonium salts and/or co-surfactants.

In one embodiment, the solvent(s) and/or the surfactant(s) can be produced by non-biological means (e.g., chemical isolation, purification and/or synthesis). In another embodiment, the solvents and/or surfactants can be derived from natural or biological sources, such as, for example, the living cells of microorganisms, plants, fungi and/or animals.

In one embodiment, the composition can further comprise one or more yeast fermentation products. In one embodiment, a yeast fermentation product comprises a yeast strain, such as, for example, *Wickerhamomyces anomalus*, *Starmerella bombicola*, or *Meyerozyma guilliermondii*, and/or by-products produced during cultivation of the yeast. In certain embodiments, the yeast cells are thermally inactivated before being added to the composition.

In certain embodiments, use of yeast fermentation products according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of biopolymer beta-glucan (also an effective emulsifier) in yeast cell walls. Additionally, the yeast fermentation product further can comprise biosurfactants capable of reducing both surface and interfacial tension, enzymes capable of solubilizing heavy hydrocarbon and/or paraffinic compounds, and other metabolites (e.g., lactic acid, ethyl acetate, ethanol, etc.), in the culture.

In some embodiments, certain fungi, other than yeasts, have cell walls containing the same advantageous properties. Accordingly, fermentation products comprising non-yeast fungi can also be used according to the subject invention.

In one embodiment, a first yeast fermentation product, designated as "Star 3+," can be obtained via cultivation of a yeast, e.g., *Wickerhamomyces anomalus*, using a modified form of solid state fermentation. The culture can be grown on a substrate with ample surface area onto which the yeasts can attach and propagate, such as, for example, corn flour, rice, soybeans, chickpeas, pasta, oatmeal or beans. The entire fermentation medium with yeast cells growing throughout, and any growth by-products thereof (e.g., enzymes, solvents, and/or biosurfactants) can be harvested after, for example, 3-5 days of cultivation at 25-30° C. The culture can be washed out and used in liquid form, or blended with the solid substrate, milled and/or micronized, and optionally, dried. This comprises the Star 3+ product. The product can be diluted in oil, water and/or brine fluids, for example, 5 to 1,000 times, prior to being added to the composition.

In an alternative embodiment, the first yeast fermentation product (e.g., Star 3+) is obtained using submerged fermentation, wherein the first yeast fermentation product comprises liquid broth comprising water, cells and any yeast growth by-products.

In one embodiment, the composition according to the subject invention comprises one or more solvents. Preferably, the one or more solvents are not produced by the yeasts of the first yeast fermentation product, meaning they are present in addition to any solvents that may happen to be present in the first yeast fermentation product.

In one embodiment, the one or more solvents are non-polar aromatic solvents. In one embodiment, the solvents can include one or more of, for example, terpenes, terpenoids, acetates, ionic or semi-ionic liquids, alcohols, kerosene, gasoline, diesel, benzene, toluene, and/or xylene.

In one embodiment, the one or more solvents can include naturally-derived acetates, such as, for example, isoamyl acetate and/or primary amyl acetate.

In one embodiment, the one or more solvents can include terpenes and/or terpenoids, such as, for example, turpentine, dipentene and/or D-limonene.

In one embodiment, the one or more solvents can include alcohols, such as hexanol and/or isopropyl alcohol.

In one embodiment, the one or more solvents can include an ionic or semi-ionic liquid, for example, a semi-ionic liquid comprising a mixture of glycerol and Epsom salt ($MgSO_4 \cdot 7H_2O$).

In one embodiment, any combination of these solvents is utilized with one or more surfactants. In one embodiment, the composition is customized based on the type of paraffin that is present in a well. For example, paraffin deposits can vary from soft accumulations to hard, brittle, solidified deposits. Thus, in some embodiments, the concentration of solvent in the composition can be increased (e.g., up to about 10% of the composition) to boost the dispersal capabilities when harder paraffins are present.

In one embodiment, the composition comprises one or more surfactants, which, along with paraffin removal and/or dispersal, can provide additional enhanced oil recovery. The surfactant(s) can be of non-biological origin and/or they can be biosurfactants, meaning surfactants produced by a living cell. Non-biological surfactants can be selected from, for example, anionic, cationic, zwitterionic and/or nonionic classes of surfactants.

In a specific embodiment, the one or more surfactants are biosurfactants. Preferably, the one or more biosurfactants are not produced by the yeasts of the first yeast fermentation product, meaning they are included in the composition in addition to any biosurfactants that may be present in the first yeast fermentation product.

In certain embodiments, the biosurfactants can be added to the composition in purified form and/or in crude form. In certain embodiments, the biosurfactant can be added to the composition in the form of a microbial culture, e.g., a second yeast fermentation product, containing liquid fermentation broth and cells resulting from submerged cultivation of a biosurfactant-producing microbe, e.g., *Wickerhamomyces anomalus*, *Starmerella bombicola* or *Meyerozyma guilliermondii*.

In some embodiments, a blend of biosurfactants is used. Biosurfactants useful according to the subject invention include, for example, low-molecular-weight glycolipids, cellobiose lipids, lipopeptides, fatty acid esters, fatty acid ethers, flavolipids, phospholipids, and high-molecular-weight polymers/biopolymers such as lipoproteins, lipopolysaccharide-protein complexes, and/or polysaccharide-protein-fatty acid complexes.

In one embodiment, the biosurfactants can comprise one or more glycolipids such as, for example, rhamnolipids (RLP), rhamnose-d-phospholipids, trehalose lipids, trehalose dimycolates, trehalose monomycolates, mannosylerythritol lipids (MEL), cellobiose lipids, ustilagic acids and/or sophorolipids (SLP) (including lactonic forms and/or acidic forms). In one embodiment, the biosurfactants can comprise one or more lipopeptides, such as, for example, surfactin, iturin, fengycin, arthrofactin, viscosin, amphisin, syringomycin, and/or lichenysin. In one embodiment, the biosurfactants can comprise one or more fatty acid esters and/or one or more fatty acid ethers. In one embodiment, the biosurfactants can comprise one or more other types of biosurfactants, such as, for example, cardiolipin, emulsan, lipomanan, alasan, and/or liposan.

In one embodiment, the surfactants can comprise one or more microbial compounds having physical properties and/or behaviors similar to those of biosurfactants, but which are not commonly known as biosurfactants. These compounds can be fatty acid esters and/or fatty acid ethers. In certain embodiments, the fatty acid compounds can comprise carbon chains with 6 to 22 carbon atoms. In certain embodiments, the fatty acid(s) of the fatty acid compounds is unsaturated.

In one embodiment, the composition further comprises one or more chelating agents, for example, EDTA, citric acid, citrate, sodium acetate, or a mixture thereof. In specific embodiments, the chelating agent is sodium citrate.

The subject composition can further comprise carriers (e.g., water, oil and/or brine fluids) as well as other compounds that are useful for paraffin removal and/or oil recovery, such as, for example, ammonium salts, co-surfactants, and/or enzymes (e.g., extracellular enzymes derived from *Aspergillus* spp.), These additional compounds can be added at concentrations ranging from, for example, about 0.001% to 50%, about 1% to 25%, or about 10%, by weight or volume.

Advantageously, the compositions of the subject invention are shelf stable for at least one week or longer, and can be transported, stored and then applied selectively to an oil well at any point, for example, after a decline in production is observed.

In certain embodiments, the subject invention provides methods of improving oil and/or gas production, wherein a composition according to the subject invention is applied to a subterranean formation, an oil and/or gas well, a wellbore, and/or equipment associated therewith. In some embodiments, the methods improve the efficiency of oil and/or gas recovery by, e.g., decreasing the amount of resources and energy required to recover oil and/or gas from a formation, and in general, increasing the amount of oil and/or gas recovered over a certain period of time.

In one embodiment, the methods improve oil and/or natural gas (hereinafter, "gas") production through the removal and dispersal of paraffin deposits and/or precipitates that have accumulated in a subterranean formation, in an oil and/or gas well, in a wellbore and/or in production equipment associated with any of these. For example, the methods are useful for removing paraffin deposits from the rock pores of subterranean formations, from wells, wellbores, and from equipment, such as, for example, tubing, pipes, drills and tanks associated with all aspects of oil and/or gas production.

Additionally, the methods provide for recovery of economically valuable paraffin hydrocarbons by dispersing and/or emulsifying the dislodged paraffin back into crude oil fluids. Advantageously, applying the subject composition also helps inhibit paraffin deposition, and helps prevent re-deposition of dispersed paraffins while pumping and transporting.

The composition can be customized for a particular well. Thus, in one embodiment, the method comprises testing the well and/or associated equipment, analyzing the paraffin composition present therein and determining the ideal formulation for the composition prior to treatment. Advantageously, the subject methods can be useful for removal and dispersal of a broad spectrum of paraffin types, including short chain paraffins and long chain paraffins.

Even further, in addition to ultimately increasing the amounts of crude oil recovered from a well due to the clearing and/or dispersing of paraffin deposits, the methods also enhance oil recovery through, for example, the amphiphilic properties of surfactants, including biosurfactants.

The subject methods can also be useful for a multitude of other benefits related to oil and gas recovery, including, for example: inhibition of paraffin crystallization and prevention of paraffin deposition; reduction in viscosity of paraffinic crude oil; reduction in pour point of paraffinic crude oil (e.g., to about −25° F./−32° C.); removal and/or dissolution of scale; release of rust from oilfield casings and related equipment; protection against under-deposit rust-related corrosion of equipment; inhibition of bacterial growth and disruption of biofilm formation on equipment; protection against microbial induced corrosion (MIC); alteration of the wettability of the near-wellbore surface to water-wet; and remediation of formation skin damage.

In one embodiment, the subject methods can be used alongside and/or to enhance or supplement other methods of paraffin removal/dispersal and/or enhanced oil recovery, e.g., other microbial, mechanical, thermal and/or chemical treatments.

The method can be used to replace dangerous high heat steaming or oiling methods commonly used for paraffin removal. When, however, thermal, steaming and/or hot oil methods are used, the present method can be used alongside (before, during or after) the thermal, steaming and/or hot oil to prevent recrystallization of the liquefied paraffins that are dispersed in the oil.

In one embodiment, the subject methods comprise a chemical treatment for removing paraffin deposits present, for example, at or near a wellbore. The chemical treatment method can comprise applying a composition that comprises one or more chemical solvents and one or more non-biological surfactants to the wellbore. Advantageously, the combination of solvents with surfactants, when compared to using, for example, solvents alone, can also provide enhanced oil recovery in addition to effectively dispersing paraffin back into crude oil fluids. Additionally, this chemical treatment does not require large volumes of treatment mixture, as is required for treating deep into a subterranean formation. The surfactants can comprise, for example, from 1% to 50% of the volume of the chemical treatment, from 2% to 20%, or from 5% to 10%.

In one embodiment, the subject methods can be utilized alongside and/or in combination with enzyme treatments for removal of hydrocarbon deposits and/or enhanced oil recovery, e.g., extracellular enzymes derived from *Aspergillus* spp.

In certain embodiments, the subject invention can be used for improving, enhancing, and/or maintaining oil recovery from, and operation of, subterranean formations, oil and/or gas wells, boreholes, tubes, pipes, drills, tanks and other structures and equipment involved in oil and/or gas production, transportation, storage and refining. The subject invention can be used in, for example, vertical, horizontal and/or fracking wells, mature wells, stripper (marginal) wells, flowlines, to clean near wellbore zones and to clean storage tanks.

In one embodiment, application of a composition of the subject invention can be performed during drilling operations (e.g., while drilling, while tripping-in or tripping-out of the hole, while circulating mud, while casing, while placing a production liner, and/or while cementing, etc.), and/or as a production treatment (e.g., after oil and/or gas recovery is underway). In some embodiments, the methods are implemented once the rate of oil production from the well has begun to decline and/or at some point thereafter.

Advantageously, in certain embodiments, the subject compositions and methods can free stuck or floating rods, allowing inoperable wells to resume operation. Furthermore, in one embodiment, the subject treatments can open up channels and pores/pore throats that are clogged with paraffin deposits and the adhesive/cohesive matrices that form when scale, polymers, sand, and other materials become lodged in the paraffin, thus allowing for improved oil production. Even further, the subject treatments require lower frequencies of application when compared to other conventional paraffin treatment methods.

Advantageously, the subject invention can be utilized in recovery and transport of oil in locations where lower temperatures might cause paraffin deposition, such as, for example, in offshore wells, in the arctic or Antarctic, and in climates that experience cold winter temperatures.

Furthermore, the subject invention can be utilized in oil wells with high formation water salinity levels. For example, the compositions can be useful in geologic regions where formation water salinity is up to 250,000 ppm (total dissolved solids), up to 300,000 ppm, or even up to 400,000 ppm or more.

Even further, the compositions can be useful in treating mature wells and wells that have undergone hot oiling, as well as for removal of short- and long-chain paraffin deposits, including those that are particularly difficult to remove due to, for example, the heaviness, thickness and/or the hardness of the deposit.

In one embodiment, the subject compositions and methods can be used without releasing large quantities of inorganic compounds into the environment. Additionally, the compositions and methods can utilize components, such as biosurfactants, that are biodegradable and toxicologically safe. Thus, while the subject invention can utilize non-biological or synthetic chemical components, the present invention can also be formulated as an environmentally-friendly treatment.

DETAILED DESCRIPTION

Figure 1:
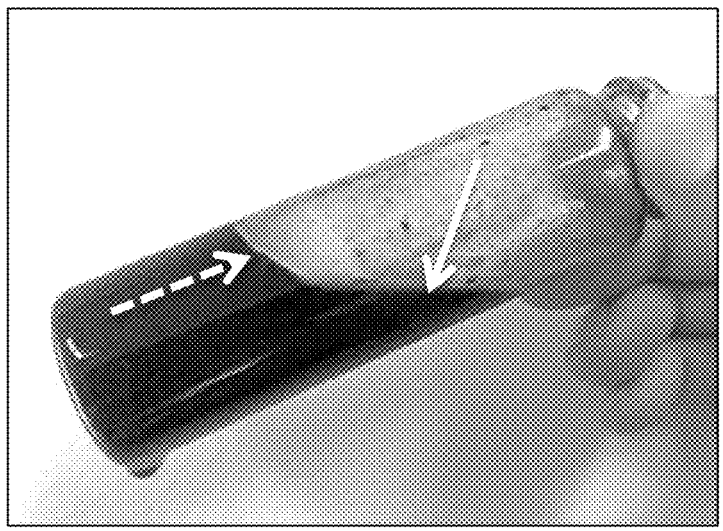
FIG. 1 shows pour point test tube treatment of paraffin with a composition according to one embodiment of the subject invention. The bottom of the test tube contains a sold paraffin portion (denoted by the dashed arrow), which became solid at −3° C. and did not flow upon tilting the test tube. D-limonene and canola oil separated from the solution while the mixture was being chilled and remained liquid (denoted by the solid arrow).

The subject invention provides compositions and methods for improving oil well performance by removing paraffin deposits from oil- and/or natural gas-bearing formations, and/or the wells and production equipment associated therewith, as well as for enhancing oil recovery.

In certain embodiments, materials and methods are provided for improving oil and/or gas production by liquefying or dissolving solid paraffin deposits and dispersing and/or emulsifying precipitated paraffin back into crude oil. Advantageously, in one embodiment, the paraffin remains dispersed in the oil after treatment and does not re-precipitate.

The subject methods can also be useful for a multitude of other benefits related to oil and gas recovery, including, for example: inhibition of paraffin deposition; release of rust from oilfield casings and related equipment; protection against under-deposit rust-related corrosion of equipment; inhibition of bacterial growth and disruption of biofilm formation on equipment; protection against microbial induced corrosion (MIC); reduction in viscosity of paraffinic crude oil; reduction in pour point of paraffinic crude oil (e.g., to about −25° F./−32° C.); removal and/or dissolution of scale; alteration of the wettability of the near-wellbore surface to water-wet; and remediation of formation skin damage.

Selected Definitions

As used herein, "contaminant" refers to any substance that causes another substance or object to become fouled or impure. Contaminants can be living or non-living and can be inorganic or organic substances and/or deposits. Furthermore, contaminants can include, but are not limited to, hydrocarbons, such as petroleum, tar sands or asphaltenes; fats, oils and greases (FOG), such as cooking grease and lard; lipids; waxes, such as paraffin; resins; biofilms; or any other substances referred to as, for example, dirt, dust, scale (including calcium carbonate, calcium chloride, barium carbonate, barium chloride, and iron sulfide), sludge, crud, slag, grime, scum, plaque, buildup, or residue.

In preferred embodiments of the subject invention, the contaminant is paraffin. According to the subject invention, paraffins include any wax-like organic hydrocarbon precipitate belonging to the alkane group and having a general formula of $C_nH_{2n+2}$. They can include normal, branched or cyclic alkanes. Further, they can include shorter chain (e.g., 20 carbons) to longer chain (e.g., 40 carbons or more) paraffins. In some instances, deposited paraffin also contains mixtures of gums, resins, asphaltic material, polymers, crude oil, scale, sand, silt, water and other formation substances. They vary in consistency from a mushy liquid to a firm hard wax, depending upon, for example, the amount and type of oil present, the temperature, and the age of the deposit.

As used herein, "removal" as used in the context of contaminants or fouling means elimination or reduction of contaminants from a surface, a space or a piece of equipment. Removal can include purifying, defouling, decontaminating, clearing or unclogging, and can be achieved by any means, including but not limited to, liquefying, dissolving, melting, dispersing, emulsifying, scraping, degrading, blasting, soaking, or cleaving the contaminant. Furthermore, removal can be total or partial.

As used herein, "prevention" means avoiding, delaying, forestalling, inhibiting or minimizing the onset or progression of an occurrence or situation. Prevention can include, but does not require, absolute or complete prevention, meaning the occurrence or situation may still develop, but at a later time than it would without preventative measures. Prevention can also include reducing the severity and/or extensiveness of an occurrence or situation, and/or inhibiting the progression in severity and/or extensiveness. In certain embodiments, the subject invention can be useful for preventing the deposition and/or re-deposition of paraffin onto a surface.

As used herein, reference to a "microbe-based composition" means a composition that comprises components that were produced as the result of the growth of microorganisms or other cell cultures. Thus, the microbe-based composition may comprise the microbes themselves and/or products of microbial growth. The microbes may be in a vegetative state, in spore form, in mycelial form, in any other form of propagule, or a mixture of these. The microbes may be planktonic or in a biofilm form, or a mixture of both. The products of growth may be, for example, metabolites, cell membrane components, expressed proteins, and/or other cellular components. The microbes may be intact or lysed; active or inactive. In some embodiments, the microbes are present, with medium in which they were grown, in the microbe-based composition. The microbes may be removed from the composition, or they may be present at, for example, a concentration of at least $1\times10^4$, $1\times10^1$, $1\times10^6$, $1\times10^7$, $1\times10^8$, $1\times10^9$, $1\times10^{10}$, $1\times10^{11}$, $1\times10^{12}$, or $1\times10^{13}$ or more propagules per milliliter of the composition. As used herein, a propagule is any portion of a microorganism from which a new and/or mature organism can develop, including but not limited to, cells, spores (e.g., reproductive spores, endospore and exospores), mycelia, cysts, conidia, buds and seeds.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added, or it may have ingredients removed therefrom. Additional ingredients can include, for example, stabilizers, buffers, appropriate carriers, such as water, salt solutions, or any other appropriate carrier, added nutrients to support further microbial growth, non-nutrient growth enhancers, such as plant hormones, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, an "isolated" or "purified" nucleic acid molecule, polynucleotide, polypeptide, protein or organic compound, such as a small molecule, is substantially free of other compounds, such as cellular material, with which it is associated in nature. A purified or isolated polynucleotide (ribonucleic acid (RNA) or deoxyribonucleic acid (DNA)) is free of the genes or sequences that flank it in its naturally-occurring state. A purified or isolated polypeptide is free of other molecules, or the amino acids that flank it, in its naturally-occurring state.

As used herein, reference to an isolated microbe strain means that the strain is removed from the environment in which it exists in nature. Thus, the isolated strain may exist as, for example, a biologically pure culture, or as spores (or other forms of the strain) in association with a carrier.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" means a negative alteration of at least 1%, 5%, 10%, 20%, 30%, 40%, 50%, 60%, 70%, 80%, 90%, or 100%.

A "metabolite" refers to any substance produced by metabolism (e.g., a growth by-product) or a substance necessary for taking part in a particular metabolic process. Examples of metabolites include, but are not limited to, enzymes, acids, solvents, gases, alcohols, proteins, vitamins, minerals, microelements, amino acids, biopolymers, and biosurfactants.

As used herein, "surfactant" means a surface-active compound that lowers the surface tension (or interfacial tension) between two liquids or between a liquid and a solid. Surfactants can act as, e.g., detergents, wetting agents, emulsifiers, foaming agents, and/or dispersants. A "biosurfactant" is a surfactant produced by a living cell.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof. All references cited herein are hereby incorporated by reference in their entirety.

Compositions

In preferred embodiments, the subject invention provides a composition for improving oil and/or gas production, the composition comprising one or more solvents and one or more surfactants. In one embodiment, any combination of solvents is utilized with any combination of surfactants.

In one exemplary embodiment, the composition comprises one or more yeast fermentation products, one or more surfactants, one or more solvents, and one or more chelating agents. Optionally, one or more ammonium salts and/or co-surfactants can also be included.

In one embodiment, the composition is customized based on the type of paraffin that is being treated. For example, paraffin deposits can vary from soft accumulations to hard, brittle, solidified deposits. Thus, in some embodiments, the concentration of solvent in the composition can be increased (e.g., up to about 10% of the composition) to boost the dispersal capabilities when harder paraffins are present. Accordingly, in certain embodiments, the practice of the subject invention comprises obtaining an analyzing a sample of paraffin from the site to be treated.

Advantageously, the compositions is shelf stable for at least one week or longer, and can be transported, stored and then applied selectively to an oil well at any point, for example, after a decline in oil and/or gas production is observed.

In one embodiment, the solvent(s) and/or the surfactant(s) can be produced by non-biological means (e.g., chemical isolation, purification and/or synthesis). In another embodiment, the solvents and/or surfactants can be derived from natural or biological sources, such as, for example, the living cells of microorganisms, plants, fungi and/or animals.

In one embodiment, the composition comprises a first yeast fermentation product that comprises a yeast strain and/or by-products produced during cultivation of the yeast. In one embodiment, the microbe is a yeast or fungus, such as, for example, *Wickerhamomyces anomalus* (*Pichia anomala*), *Starmerella bombicola* or *Meyerozyma guilliermondii* (*Pichia guilliermondii*). In certain embodiments, the yeasts are inactivated, for example, using thermal inactivation, prior to being added to the subject composition.

In certain embodiments, use of yeast fermentation products according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of biopolymer beta-glucan (also an effective emulsifier) in yeast cell walls. Additionally, the yeast fermentation product further can comprise biosurfactants capable of reducing both surface and interfacial tension, enzymes capable of solubilizing heavy hydrocarbon and/or paraffinic compounds, and other metabolites (e.g., lactic acid, ethyl acetate, ethanol, etc.), in the culture.

In some embodiments, certain fungi, other than yeasts, have cell walls containing the same advantageous properties. Accordingly, fermentation products comprising non-yeast fungi can also be used according to the subject invention.

In one embodiment, a first yeast fermentation product, designated as "Star 3+," can be obtained via cultivation of a yeast, e.g., *Wickerhamomyces anomalus*, using a modified form of solid state fermentation. The culture can be grown on a substrate with ample surface area onto which the yeasts can attach and propagate, such as, for example, corn flour, rice, soybeans, chickpeas, pasta, oatmeal or beans. The culture can be washed out and used in liquid form, or blended with the solid substrate, milled and/or micronized, and optionally, dried. This comprises the Star 3+ product. The product can be diluted in water and/or brine fluids, for example, at least 5, 10, 100, 500 or 1,000 times prior to being added to the composition.

In an alternative embodiment, the first yeast fermentation product is obtained using submerged fermentation, wherein the first yeast fermentation product comprises liquid broth and, optionally, cells and any yeast growth by-products resulting from the submerged fermentation.

The composition according to the subject invention can comprise one or more solvents to aide in, for example, dissolving and dispersing paraffins. In one embodiment, a combination of solvents is utilized. In one embodiment, the composition comprises solvents at a concentration of about 50% or less, 25% or less, or 10% or less, by volume.

Preferably, the one or more solvents are not produced by the yeasts of the yeast fermentation product, meaning they are included in addition to any solvents that may be produced by the yeast of the first yeast fermentation product.

Examples of solvent(s) that can be utilized according to the subject invention include, but are not limited to, terpenes, terpenoids, alcohols, ionic or semi-ionic liquids, acetates, aliphatic and/or aromatic hydrocarbons, olefins, esters, oxygenates, ketones, acetic acid, kerosene, gasoline, diesel, benzene, ethyl benzenes, propyl benzenes, butyl benzenes, toluene, ethyl toluenes, xylene, pentane, alkylene amines, dioxane, carbon disulfide, mesitylene, cumene, cymenes, saturated aliphatic and/or alicyclic hydrocarbons, naphtha, naphthenes, cyclohexane, decalin, tetralin, heptane, octane, cyclooctane, isooctane, cycloheptane, turpentine, carbon tetrachloride, ether alcohol, pinene, dialkyl ether and/or any combination thereof.

In one embodiment, the one or more solvents are non-polar aromatic solvents. In one embodiment, the solvents can include one or more of, for example, terpenes, terpenoids, acetates, ionic or semi-ionic liquids, alcohols, kerosene, gasoline, diesel, benzene, toluene, and/or xylene.

In certain embodiments, the solvents can comprise one or more acetates. In one embodiment, the acetates are naturally-derived. In preferred embodiments, the acetates include isoamyl acetate and/or primary amyl acetate. The acetate(s) can be included at a concentration of about 10 ml/L to 200 ml/L, about 20 ml/L to 175 ml/L, about 30 ml/L to 150 ml/l, about 40 ml/L to 125 ml/L, or about 50 ml/L to 100 ml/L.

In certain embodiments, the solvents can comprise one or more terpenes and/or terpenoids. In some embodiments, the terpenes or terpenoids are derived from plants, such as citrus plants or pine trees. Terpenes and terpenoids can include but are not limited to, limonenes, orange terpenes, lemon terpenes, grapefruit terpenes, orange oil, lemon oil, other citrus terpenes, other citrus oils, geraniol, terpineol, dipentene, myrcene, linalool, cymene and pinene.

In a preferred embodiment, the terpenes and/or terpenoids include turpentine, D-limonene and/or dipentene at a concentration of about 1.0% to about 10.0% by weight, or about 2.0% to about 8.0% by weight. In one embodiment, the concentration of turpentine, D-limonene and/or dipentene is about 10 ml/L to 200 ml/L, about 20 ml/L to 175 ml/L, about 30 ml/L to 150 ml/l, about 40 ml/L to 125 ml/L, or about 50 ml/L to 100 ml/L.

In certain embodiments, the solvents can comprise one or more alcohols, such as, for example, ethanol, methanol, propanol, isopropyl alcohol and/or hexanol. In one embodiment, the composition comprises hexanol and/or isopropyl alcohol, at a concentration of about 1 ml/L to 200 ml/L, about 2 ml/L to 175 ml/L, about 3 ml/L to 150 ml/l, or about 4 ml/L to 100 ml/L.

In certain embodiments, the solvents can comprise one or more ionic or semi-ionic liquids. Exemplary ionic or semi-ionic liquids suitable for the subject composition include, but are not limited to, ethyl ammonium nitrate, and/or a semi-ionic mixture of glycerin/glycerol with magnesium sulfate heptahydrate ($MgSO_4 \cdot 7H_2O$). In one embodiment, the mixture of glycerol and Epsom salt ($MgSO_4 \cdot 7H_2O$) has a ratio of glycerol to Epsom salt of 1:1 to 1:10, or from 1:1 to 10:1.

In some embodiments, the ionic or semi-ionic liquid can act as a co-solvent and can prevent the formation of ring bonds in hydrocarbon compositions, which is one cause of hydrocarbon precipitation.

In one embodiment, the ionic or semi-ionic liquid is present in the composition at a concentration of about 10 ml/L to 200 ml/L, about 20 ml/L to 175 ml/L, about 30 ml/L to 150 ml/l, about 40 ml/L to 125 ml/L, or about 50 ml/L to 100 ml/L.

In one embodiment, the composition comprises one or more surfactants, which, along with paraffin removal and/or dispersal, can provide additional enhanced oil recovery due to, for example, their surface and interfacial tension reduction properties.

The surfactant(s) can be of non-biological origin and/or they can be biosurfactants, meaning surfactants produced by a living cell. Non-biological surfactants can be selected from, for example, anionic, cationic, zwitterionic and/or nonionic classes of surfactants.

In certain embodiments, the surfactants are microbial biosurfactants or a blend of more than one type of biosurfactant. Biosurfactants are a structurally diverse group of surface-active substances produced by microorganisms. Biosurfactants are biodegradable and can produced using selected organisms in or on renewable substrates.

All biosurfactants are amphiphiles. They consist of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and change the properties of bacterial cell surfaces.

Furthermore, biosurfactants accumulate at interfaces, and reduce the surface and interfacial tension between the molecules of liquids, solids, and gases, thus leading to the formation of aggregated micellar structures in solution.

Biosurfactants according to the subject invention include, for example, low-molecular-weight glycolipids, lipopeptides, fatty acid ester compounds, fatty acid ether compounds, flavolipids, phospholipids, and high-molecular-weight polymers/biopolymers such as lipoproteins, lipopolysaccharide-protein complexes, and/or polysaccharide-protein-fatty acid complexes. Preferably, the biosurfactants are produced by microorganisms In one embodiment, the biosurfactants can comprise one or more glycolipids such as, for example, rhamnolipids, rhamnose-d-phospholipids, trehalose lipids, trehalose dimycolates, trehalose monomycolates, mannosylerythritol lipids, cellobiose lipids, ustilagic acid and/or sophorolipids (including lactonic and/or acidic forms).

In an exemplary embodiment, the surfactant is a mannosylerythritol lipid (MEL), comprising either 4-O—B-D-mannopyranosyl-meso-erythritol or 1-O—B-D-mannopyranosyl-meso-erythritol as the hydrophilic moiety, and fatty acid groups and/or acetyl groups as the hydrophobic moiety. One or two of the hydroxyls, typically at the C4 and/or C6 of the mannose residue, can be acetylated. Furthermore, there can be one to three esterified fatty acids, from 8 to 12 carbons or more in chain length.

MEL molecules can be modified, either synthetically or in nature. For example, MEL can comprise different carbon-length chains or different numbers of acetyl and/or fatty acid groups.

MEL molecules and/or modified forms thereof according to the subject invention can include, for example, tri-acylated, di-acylated, mono-acylated, tri-acetylated, di-acetylated, mono-acetylated and non-acetylated MEL, as well as stereoisomers and/or constitutional isomers thereof.

In certain specific embodiments, the MEL molecules are selected from members of the following groups: MEL A (di-acetylated), MEL B (mono-acetylated at C4), MEL C (mono-acetylated at C6), MEL D (non-acetylated), tri-acetylated MEL A, tri-acetylated MEL B/C, and further including all possible isomers of the members of these groups.

Other MEL-like molecules that exhibit similar structures and similar properties, can also be produced according to the subject invention, e.g., mannosyl-mannitol lipids (MML), mannosyl-arabitol lipids (MAL), and/or mannosyl-ribitol lipids (MRL).

In one embodiment, the biosurfactants can comprise one or more lipopeptides, such as, for example, surfactin, iturin, fengycin, arthrofactin, viscosin, amphisin, syringomycin, and/or lichenysin.

In one embodiment, the biosurfactants can comprise one or more other types of biosurfactants, such as, for example, cardiolipin, emulsan, lipomanan, alasan, and/or liposan.

In one embodiment, the surfactants can comprise one or more microbial-produced fatty acid ester compounds having physical properties and/or behaviors similar to those of biosurfactants, but which are not commonly known as biosurfactants.

In certain embodiments, the fatty acid ester compounds can be represented by the following formula:

wherein
Z=O
$R_1$=$C_6$ to $C_{22}$ saturated or unsaturated hydrocarbon, or an epoxide, or cyclopropane thereof
$Y_1$=H, $C_1$-$C_5$ hydrocarbon, or hydroxyl at any position along $R_1$
$Y_2$=H, $C_1$-$C_5$ hydrocarbon, or hydroxyl at any position along $R_1$
$Y_3$=H, $C_1$-$C_5$ hydrocarbon, or hydroxyl at any position along $R_2$
$Y_4$=H, $C_1$-$C_5$ hydrocarbon, or hydroxyl at any position along $R_2$
$R_2$=$C_1$-$C_{10}$ saturated or unsaturated, branched or unbranched, hydrocarbon.

In certain embodiments, the fatty acid ester compounds can include, for example, highly esterified oleic fatty acids, such as oleic fatty acid ethyl esters and/or oleic fatty acid methyl esters (FAME).

In one embodiment, the surfactants can comprise one or more microbial-produced fatty acid ether compounds having physical properties and/or behaviors similar to those of biosurfactants, but which are not commonly known as biosurfactants.

In certain embodiments, the fatty acid ether compounds can be represented by the following formula:

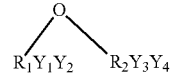

wherein
$R_1$=$C_6$ to $C_{22}$ saturated or unsaturated hydrocarbon, or an epoxide, or cyclopropane thereof
$Y_1$=H, $C_1$-$C_5$ hydrocarbon, or hydroxyl at any position along $R_1$
$Y_2$=H, $C_1$-$C_5$ hydrocarbon, or hydroxyl at any position along $R_1$
$Y_3$=H, $C_1$-$C_5$ hydrocarbon, or hydroxyl at any position along $R_2$
$Y_4$=H, $C_1$-$C_5$ hydrocarbon, or hydroxyl at any position along $R_2$
$R_2$=$C_1$-$C_{10}$ saturated or unsaturated, branched or unbranched, hydrocarbon.

In one embodiment, the biosurfactants can be added to the composition in a crude and/or purified form. In one embodiment, the concentration of biosurfactant is about 10 ml/L to 200 ml/L, about 25 ml/L to 175 ml/L, about 30 ml/L to 150 ml/l, about 40 ml/L to 125 ml/L, or about 50 ml/L to 100 ml/L.

In preferred embodiments, the surfactant concentration is no lower than critical micelle concentration (CMC) at the time the composition is introduced into the formation (e.g., after natural dilution occurs within the formation). Such concentration can be calculated by the skilled artisan having the benefit of the subject disclosure.

The biosurfactants can be present as a growth by-product of a cultivated yeast, although preferably, they are included in addition to any biosurfactants that may happen to be present as growth by-products in the first yeast fermentation product.

In certain embodiments, the biosurfactant can be added to the composition in the form of a microbial culture, e.g., a second yeast fermentation product, containing liquid fermentation broth and cells resulting from submerged cultivation of a biosurfactant-producing microbe, e.g., *Wickerhamomyces anomalus, Starmerella bombicola* or *Meyerozyma guilliermondii*. In certain embodiments, the second yeast fermentation is not produced using the same yeast as the first yeast fermentation product.

In a specific embodiment, when the biosurfactant is a sophorolipid (SLP), a second yeast fermentation product comprising fermentation broth with *Starmerella bombicola* yeast cells and SLP therein, can be added to the composition. The fermentation broth after, for example, 5 days of cultivation at 25° C., can contain the yeast cell suspension and, for example, 150 g/L or more of SLP.

The yeast cells may be active or inactive at the time they are added to the composition. When lower concentrations of SLP are desired, the SLP portions of the culture, which forms a distinct layer in the culture, can be removed, and the residual liquid having, for example, 1-4 g/L residual SLP and, optionally, yeast cells and other growth by-products, can be utilized in the subject composition. When use of another biosurfactant is desired, a similar product is envisioned that utilizes any other microbe capable of producing the other biosurfactant.

In one embodiment, the amount of the second yeast fermentation product in the composition is about 15 to 25% of the total composition by volume, preferably about 20% of total volume.

In one embodiment, the surfactants of the compositions are obtained through cultivation of microorganisms using processes ranging from small to large scale. The cultivation process can be, for example, submerged cultivation, solid state fermentation (SSF), and/or a combination thereof.

In one embodiment, the composition further comprises one or more chelating agents. As used herein, "chelator" or "chelating agent" means an active agent capable of removing a metal ion from a system by forming a complex so that the metal ion, for example, cannot readily participate in or catalyze oxygen radical formation.

Examples of chelating agents suitable for the present invention include, but are not limited to, dimercaptosuccinic acid (DMSA), 2,3-dimercaptopropanesulfonic acid (DMPS), alpha lipoic acid (ALA), thiamine tetrahydrofurfuryl disulfide (TTFD), penicillamine, ethylenediaminetetraacetic acid (EDTA), sodium acetate, sodium citrate and citric acid.

In one embodiment, the chelating agent is selected from EDTA, citric acid, citrate, sodium acetate, or a mixture thereof. The chelating agent or mixture thereof can be added to the composition in concentrations of about 1 g/L to about 50 g/L, or about 5 g/L to about 25 g/L, or about 10 g/L to about 15 g/L. In specific embodiments, the chelating agent is sodium citrate.

The subject composition can further comprise carriers (e.g., water, oil and/or brine fluids), as well as other optional compounds that are useful for paraffin removal and/or enhanced oil recovery, such as, for example, ammonium salts, co-surfactants, and/or enzymes. These additional compounds can be added at concentrations ranging from, for example, about 0.001% to 50%, about 1% to 25%, or about 10%, by weight or volume.

In one embodiment, the composition optionally comprises one or more ammonium salts, for example, ammonium hydroxide, ammonium phosphate, monoammonium phosphate, diammonium phosphate, ammonium chloride, or another dibasic or monobasic ammonium salt. Advantageously, in one embodiment, ammonium salts can serve pH adjusters in the composition, balancing the pH of the composition towards, or at, a neutral pH (e.g., about pH 6 to 8) even in the presence of acidic substances, such as brine fluids. This can be useful for improving the acid number of crude oil recovered from the treated formation, as well as for preventing the corrosion of equipment due to contact with acidic substances.

In some embodiments, the ammonium salt(s) comprise ammonium hydroxide (e.g., a 70% solution) at a concentration of about 1 ml/L to 10 ml/L, or about 2 ml/L to 8 ml/L, or about 3 ml/L to 5 ml/L; and/or monoammonium phosphate, at a concentration of about 1 g/L to 50 g/L, or about 2 g/L to about 30 g/L, or about 10 g/L to about 20 g/L.

In one embodiment, the composition optionally comprises one or more co-surfactants. In certain embodiments, the co-surfactant is monoammonium phosphate or a surfactant as described previously herein, e.g., a MEL or an esterified fatty acid.

In certain embodiments, the composition comprises one or more yeast fermentation products, one or more surfactants, one or more solvents, one or more chelating agent(s), and, optionally, one or more ammonium salts and/or co-surfactants.

In one exemplary embodiment, the one or more yeast fermentation products comprise Star 3+.

In one exemplary embodiment, the one or more surfactants comprise MEL, an esterified fatty acid, and/or SLP.

In one exemplary embodiment, the one or more solvents comprise isopropyl alcohol, isoamyl acetate, primary amyl acetate, turpentine, dipentene and/or D-limonene.

In one exemplary embodiment, the one or more chelating agents comprise sodium citrate.

In one exemplary embodiment, the optional one or more ammonium salts comprise ammonium hydroxide and/or monoammonium phosphate. In certain embodiment, monoammonium phosphate can also serve as a co-surfactant.

In one embodiment, the composition can be diluted using water, oil, or any other diluent, including, for example, sterilized produced water from an oil well.

Advantageously, the compositions of the subject invention provide a wide range of benefits to the oil and gas industry, including at all stages of production. For example, the subject compositions can be used as cleaning agents to remove and liquefy paraffin deposits; paraffin dispersants; emulsifiers; viscosity reducers; EOR agents; paraffin inhibitors; antibacterial agents; corrosion inhibitors; and other uses, as are described throughout this description.

Further advantages to the subject compositions include that they can be formulated to be particularly potent for use in liquefying long-chain paraffins, which can be particularly difficult to dissolve;

they can be utilized in mature oil wells, or wells where hot oiling has been implemented (these types of wells can contain deposits of complex paraffins, as well as deposits having greater thickness and/or solidity than other wells);

they can be utilized in recovery and transport of oil in locations where lower temperatures might cause paraffin deposition, such as, for example, in offshore wells, in the arctic or Antarctic, and in climates that experience cold winter temperatures (e.g., as low as −32° C. or lower); and they can be utilized in oil wells with high formation water salinity levels (e.g., in geologic regions where formation water salinity is up to 250,000 ppm (total dissolved solids), up to 300,000 ppm, or even up to 400,000 ppm or more).

Methods for Treating Paraffin and Enhancing Oil Recovery

The subject invention provides materials and methods for improving oil and/or gas production from a well and/or a subterranean formation. In particular, the subject invention can be used to remove paraffins and other contaminants from wells, wellbores, subterranean formations and production equipment associated with wells, wellbores, and formations, that might, for example, obstruct or slow the flow of oil and/or gas. Furthermore, in one embodiment, the subject method can enhance oil recovery from an oil well or formation.

The subject methods can be used in, for example, vertical, horizontal and/or fracking wells, mature wells, stripper (marginal) wells, flowlines, as well as to clean and/or maintain wellbores, piping, tubing, storage tanks, and other equipment. Advantageously, use of the subject invention can improve and/or enhance oil recovery, aid in well stimulation, and restore the health (e.g., production capacity) of under-producing or even dead wells.

In certain embodiments, the subject invention provides methods of improving oil and/or gas production, wherein a composition according to the subject invention is applied to a subterranean formation, an oil and/or gas well, a wellbore, and/or equipment associated therewith. In certain embodiments, the methods can also enhance oil recovery from the oil well. In some embodiments, the methods are implemented once the rate of oil production from a well has begun to decline due to, for example, obstructing contaminants.

Advantageously, the methods are effective at dissolving paraffinic buildup without need for mechanical cleaning solutions. In some embodiments, the methods obviate the need for toxic solvents.

The methods can utilize compositions that are customized for a particular well. Thus, in one embodiment, the method comprises testing the well and/or associated equipment, analyzing the paraffin composition present therein and determining the preferred formulation for the composition prior to treatment. Advantageously, the subject methods can be useful for removal and dispersal of a broad spectrum of paraffin types, including shorter chain paraffins as well as longer chain paraffins that are particularly difficult to remove due to, for example, the heaviness, thickness and/or the hardness of the deposit.

In one embodiment, the methods improve oil and/or natural gas production through the removal and dispersal of paraffin deposits and/or precipitates that have accumulated in a subterranean formation, in an oil and/or gas well, in a wellbore and/or in production equipment associated with any of these. For example, the methods are useful for removing paraffin deposits from the rock pores of subterranean formations, from wells, wellbores, and from equipment, such as, for example, tubing, pipes, drills and tanks associated with all aspects of oil and/or gas production. In certain embodiments, the subject compositions and methods can also free stuck or floating rods, allowing inoperable wells to resume operation. The methods can also be useful in treating mature wells and wells that have undergone hot oiling.

Additionally, the methods provide for recovery of economically valuable paraffin hydrocarbons by dispersing and/or emulsifying the dislodged paraffin back into crude oil fluids. Advantageously, applying the subject composition helps inhibit paraffin crystallization and deposition, and helps prevent re-crystallization and re-deposition of dispersed paraffins while pumping and transporting. The methods are even effective at keeping the paraffins suspended/emulsified in the crude oil fluids at temperatures less than 90° C., less than 50° C., less than 25° C., and even less than 0° C., for example from −3° C. to −32° C.

Furthermore, in addition to ultimately increasing the amounts of crude oil recovered from a well due to the clearing and/or dispersing of paraffin deposits, the methods also enhance oil recovery through, for example, the amphiphilic properties of surfactants, including biosurfactants.

The subject methods can also be useful for a multitude of other benefits related to oil and gas recovery, including, for example: inhibition of paraffin crystallization and prevention of paraffin deposition; reduction in viscosity of paraffinic crude oil; reduction in pour point of paraffinic crude oil (e.g., to about −25° F./−32° C.); removal and/or dissolution of scale; release of rust from oilfield casings and related equipment; protection against under-deposit rust-related corrosion of equipment; inhibition of bacterial growth and disruption of biofilm formation on equipment; protection against microbial induced corrosion (MIC); alteration of the wettability of the near-wellbore surface to water-wet; and remediation of formation skin damage.

As used herein, "applying" a composition or product refers to contacting it with a target or site such that the composition or product can have an effect on that target or site. The effect can be due to, for example, the individual ingredients of the subject compositions and/or a synergistic combination thereof. There are multiple ways that the method may be implemented using a composition according to the subject invention, for example, the compositions can be injected into oil wells and/or the piping, tubulars, casing, annulus, pumps, and tanks associated with oil-bearing formations, oil wells, oil production, oil transmission and oil transportation.

Application of the composition can be performed during drilling operations (e.g., while drilling, while tripping-in or tripping-out of the hole, while circulating mud, while casing, while placing a production liner, and/or while cementing, etc.). Application can also occur as a production treatment, for example, by introducing the composition into an oil well after oil production is underway and/or after a decline in the rate of oil production from the formation has occurred.

The volume of treatment used can be determined taking into account, for example, formation porosity, permeability and deposit thickness. In some embodiments, the treatment can produce effects in less than 24 hours of shut-in time.

In one exemplary embodiment, a composition of the subject invention is poured or injected down the casing side (back lines) of a well and allowing it to mix with the fluid that is already in the well. When enough fluid is present, the composition can then optionally be circulated by, for example, a pump for 24-72 hours, preferably 48-72 hours.

Prior to circulating, the composition may be allowed to set for 8 to 24 hours, for example. The setting time, circulating time and dosage depend on the amount of paraffin and/or other contaminants anticipated to be present, as well as the depth and size of the well. A basic initial dosage can be, but is not limited to, 20 gallons of composition and for maintaining a clear structure, at least about 5 gallons of composition per well on periodic basis, e.g. biweekly, monthly, bimonthly.

In one exemplary embodiment, the methods comprise pumping, for example, 100 to 1,000 gallons of more of the composition into and out of an oil well. Injection rates can be determined by a skilled oil well operation, although, as an example, an injection rate of 1 to 20 gallons per minute, or 1 to 20 barrels per minute can be used in some embodiments.

In one exemplary embodiment, the methods comprise applying between about 100-1,000 gallons, or 200 to 600 gallons of the composition into the annulus between the tubing and casing, where it can flow through the pump and into the tubing.

In some embodiments, the composition can be introduced into the formation through perforations in the casing. The composition may be forced into the surrounding formation by applied pressure or, if the composition is allowed to set at the bottom of the casing, the composition may seep into the formation without additional pressure. The composition permeates the formation, improving the rate of oil recovery by a number of mechanisms such as, for example, dissolving paraffin and other contaminant blockages in the formation pore throats.

The composition may be introduced by means of injection pumps into off-shore gas or oil wells to reduce contaminants in well casings and transmission lines. In addition to the problems associated with land oil wells, the lines and contents between the bottom of the ocean and the platform associated with off-shore wells are cooled by the ocean or sea water, thus increasing the crystallization and deposition rate of scale, paraffin and asphaltene. To treat the lines, from 1-500 gallons up to 1000 barrels, 10,000 barrels, or more, for example, of the composition can be introduced therein.

In some embodiments, brine fluids can be injected into a well after the subject compositions in order to push the treatment deeper into the formation.

The subject treatment can be effective in a range of different geologic formations. For example, the subject invention can be useful in formations as deep as about 7,000 feet or deeper, and as shallow as about 1,500 feet or shallower. Additionally, the invention can be useful in formations having a range of porosity and/or permeability, for example from about 0.1% to about 20% or more. The invention can also be useful in formations having a wide range of temperatures, pH, and salinity.

In one embodiment, the subject methods can replace methods that utilize synthetic or chemical paraffin inhibiters for preventing crystallization, precipitation and/or deposition of paraffin. Furthermore, the subject methods can reduce or replace the need for physical alteration of equipment to prevent paraffin crystallization and deposition.

In one embodiment, the subject invention can be used to improve one or more qualities of crude oil. For example, in one embodiment, the methods can be used to reduce the viscosity of paraffinic crude oil, thus allowing for more efficient recovery of the oil from a well.

In another embodiment, improving one or more qualities of crude oil comprises altering the pour point and/or cloud point of paraffinic crude oil, for example, by lowering the pour point and/or cloud point. Reduction in cloud point and/or pour point allows for the methods and composition of the subject invention to be utilized in lower temperatures, for example, with offshore oil wells, in formations and equipment present or being transported in colder climates, and/or during the winter. This is because, in the case of pour point, the temperature at which the oil crystallizes and/or freezes is lower, and in the case of cloud point, the temperature at which the dissolved solids and paraffins in the oil precipitate is lower. Thus, the subject invention can be used to prevent re-deposition of paraffins while pumping and transport, even in colder temperatures. In a specific embodiment, the subject invention can lower the pour point of paraffinic crude oil to about $-25°$ F., or to about $-32°$ C.

In one embodiment, the subject methods can be used to remove and/or dissolve scale present in a formation and/or on equipment. These problematic deposits can be formed by, for example, deposits of precipitated mineral salts, which can arise as a result of, for example, changes in the pressure, composition and/or temperature of the crude oil. Scales can result from precipitates of, for example, barium sulfate, calcium carbonate, strontium sulfate, calcium sulfate, sodium chloride, silicon dioxide, iron sulfide, iron oxides, iron carbonate, silicates, phosphates and oxides, or any of a number of compounds that are insoluble or mildly soluble in water.

In one embodiment, the methods of the subject invention can be used for preventing corrosion associated with rust deposits, which can develop underneath paraffin deposits. In one embodiment, the compositions and methods can also help release other rust deposits from oilfield casings and other related equipment.

In one embodiment, the methods can be used to inhibit bacterial growth within an oil well or associated equipment, including inhibiting biofilm formation and/or disrupting biofilms present on the surfaces of equipment. The invention can be useful against Gram-negative and Gram-positive bacteria, such as chemoautotrophic bacteria, sulfate-reducing bacteria, sulfuric acid-producing bacteria, iron-oxidizing bacteria, and/or acid or ammonia-producing bacteria, and can help protect oil and gas production equipment from MIC.

In one embodiment, the methods can open up channels and pores that are clogged with paraffin deposits, as well as with the adhesive/cohesive matrices that form when scale, polymers, sand, and other materials become lodged in the paraffin, thus allowing for improved formation permeability and oil production. In one embodiment, the subject methods can also alter the wettability of formation rock so that it is water-wet. Thus, the subject methods can be used to remediate formation "skin damage."

Skin damage is an occurrence characterized by a zone of reduced permeability within the vicinity of the wellbore. The reduction in permeability can be a result of, for example, deposits, such as paraffins, asphaltenes, and bacterial biofilms, as well as alterations in the wettability of formation rock from water-wet to oil-wet due to, for example, contaminating deposits, oil-based drilling fluids, and the use of BTEX solvents.

The subject treatment can be effective in a range of different geologic formations. For example, the subject invention can be useful in formations as deep as about 7,000 feet or deeper, and as shallow as about 1,500 feet or shallower. Additionally, the invention can be useful in formations having ranges of porosity and/or permeability, for example from about 0.1% to about 20% or more.

The invention can also be useful in formations having a wide range of temperatures, pH, and salinity. For example, the subject invention can be utilized in recovery and transport of oil in locations where lower temperatures might cause paraffin deposition, such as, for example, in offshore wells, in the arctic or Antarctic, and in climates that experience cold winter temperatures.

Additionally, the subject invention can be utilized in oil wells with high formation water salinity levels. For example, the compositions can be useful in geologic regions where formation water salinity is up to 250,000 ppm (total dissolved solids), up to 300,000 ppm, or even up to 400,000 ppm or more.

In certain embodiments, the methods can also be used for maintenance of equipment, for example, pipes, tubulars, drills, pumps, casings, tanks, rods, boreholes, and other structures and equipment involved in oil and/or gas production and processing. In some embodiments, the composition may be applied directly to equipment. For example, prior to placing rods and casings into gas and/or oil wells, these parts may be sprayed with, or soaked in, the composition. The parts may be dipped into tanks filled with the composition to prevent under-deposit corrosion and buildup of contaminants.

Any equipment or component of oil production, processing, transportation, storage and/or refining can be treated and maintained with a composition of the subject invention. Advantageously, the subject invention can be applied to equipment involved in all stages of the chain of operations, including exploration and production (E&P) (e.g., onshore and offshore wellbores, flowlines, and tanks), midstream (e.g., pipelines, tankers, transportation, storage tanks), and in refineries (e.g., heat exchangers, furnaces, distillation towers, cokers, hydrocrackers).

In one embodiment, maintenance of equipment is achieved through the prevention, removal, and/or dispersal of contaminating deposits that form on the equipment. There are many types of contaminants associated with oil production equipment, such as paraffins, scales, oils, asphalts/asphaltenes, resins, sulfur, tar by-products, biofilms, and other viscous materials. The composition of the present invention can be used to remove any one or more of the contaminants associated with oil recovery, transmission and processing. In certain specific embodiments, the contaminant is paraffin.

In one embodiment, the subject invention can be used for preventing precipitation and/or deposition of contaminants from occurring. Thus, the present invention allows for delaying or completely removing the necessity for preventative maintenance related to removing precipitates and deposits, as well as the need for replacing or repairing equipment parts.

The subject composition can further be applied for dissolving and dispersal of contaminant buildup in, for example, storage and transportation tanks, tankers, ships, trucks, pipelines and flowlines, without need for mechanical cleaning solutions or toxic solvents.

In one embodiment, methods of cleaning a storage or transportation tank are provided, wherein air or methane is injected under pressure into a tank. This can either be preceded by or followed by injection of the subject composition. Waste water is pumped to a treatment plant after treatment with the subject composition. Preferably, the air or methane is injected into the tank to allow for approximately 10 minutes of roiling.

In certain embodiments of the subject methods, the composition may be applied with a substance that promotes adherence of composition to a surface to be treated. The adherence-promoting substance may be a component of composition or it may be applied simultaneously with, or sequentially with, the composition. Adherence-promoters can include organic or inorganic particles, ions such as calcium, magnesium, phosphate, and sodium, iron, carbon sources that are metabolized to acetyl coenzyme A, acetyl phosphate, and acetate.

Up to, for example, 50 wt. % or more of further additives may be applied, as needed, for particular applications, such as to vary the VOC levels, increase penetration of the composition, decrease viscosity of the composition, and/or as couplers for solvent insolubles in the mixture.

Suitable additives include, but are not limited to, C8-C14 alcohol ester blends, glycols, glycol ethers, acid esters, diacid esters, petroleum hydrocarbons, amino acids, alkanolamines, amines, methyl or isobutyl esters of C4-C6 aliphatic dibasic esters and n-methyl-2 pyrolidone.

C8-C14 alcohol ester blends include EXXATE 900, 1000, 1200 from Exxon Chemical; glycols include propylene glycol, dipropylene glycol, and tripropylene glycol; and glycol ethers include dipropylene glycol monomethyl ether, propylene glycol monomethyl ether, propylene glycol-n-butyl ether, ethylene glycol monobutyl ether, and diethylene glycol monobutyl ether. Acid esters include methyl oleate and methyl linoleate, and diacid esters include methyl or butyl diesters of glutaric, adipic, and succinic acids. Petroleum hydrocarbons include AROMATIC 100, AROMATIC 150 ISOPAR M, and ISOPAR K.

Amines such as morpholine; 1,3-dimethyl-2-imidazolidinone; 1, 3-propanediamine; 2-amino-1,3-propanediol; and 3-amino propanol; as well as alkanolamines such as triethanolamine, diethanolamine, 2-aminomethyl propanol, and monoethanolamine act as dispersants for contaminants and solubilize fatty acids and oils. Amino acids, provide non-toxic alternatives to monoethanolamine, and act as metal chelators. Methyl or isobutylesters of C4-C6 aliphatic dibasic esters and n-methyl-2 pyrolidone are also useful.

Other additives typically used in compositions may be used, including water softening agents, sequestrants, corrosion inhibitors, and antioxidants, which are added in amounts effective to perform their intended function. These additives and amounts thereof are well within the skill of the art. Suitable water softening agents include linear phosphates, styrene-maleic acid co-polymers, and polyacrylates. Suitable sequestrants include 1,3-dimethyl-2-immidazolidinone; 1-phenyl-3-isoheptyl-1,3-propanedione; and 2 hydroxy-5-nonylacetophenoneoxime. Examples of corrosion inhibitors include 2-aminomethyl propanol, diethylethanolamine benzotriazole, and methyl benzotriazole. Antioxidants suitable for the present invention include (BHT) 2,6-di-tert-butyl-para-cresol, (BHA) 2,6-di-tert-butyl-para-anisole, Eastman inhibitor O A BM-oxalyl bis (benzylidenehydrazide), and Eastman DTBMA 2,5-di-tert-butylhydroquinone.

All additives should have a flash point greater than 100° F., preferably greater than 150° F. and more preferably 195° F. TCC in order to achieve a final product flash point greater than 200° F.

In one embodiment, the subject methods can be used alongside and/or to enhance or supplement other methods of paraffin removal and/or enhanced oil recovery, e.g., other microbial, mechanical, thermal and/or chemical treatments.

The method can be used to replace dangerous high heat steaming or oiling methods commonly used for paraffin removal. When, however, thermal, steaming and/or hot oil methods are used, the present method can be used alongside (before, during or after) the thermal, steaming and/or hot oil to prevent recrystallization of the liquefied paraffins that are dispersed in the oil.

In one embodiment, the subject methods comprise a chemical treatment for removing paraffin deposits present, for example, at or near a wellbore. The chemical treatment method can comprise applying a composition that comprises one or more chemical solvents and one or more non-biological surfactants to the wellbore. Advantageously, the combination of solvents with surfactants, when compared to using, for example, solvents alone, can also provide enhanced oil recovery in addition to effectively dispersing paraffin back into crude oil fluids. Additionally, this chemical treatment does not require large volumes of treatment mixture, as is required for treating deep into a subterranean formation. The surfactants can comprise, for example, from 1% to 50% of the volume of the chemical treatment composition, from 2% to 20%, or from 5% to 10%.

The subject compositions and methods can be used before and/or after administration of a mechanical, thermal and/or chemical treatment, and/or simultaneously therewith. Furthermore, the subject compositions and methods can simply comprise a mechanical, thermal and/or chemical treatment on its own.

Examples of mechanical treatments include, but are not limited to, scraping, cutting and/or knifing, soluble pigs (made of, e.g., naphthalene or microcrystalline wax) or insoluble pigs (made of, e.g., plastic or hard rubber). Mechanical prevention of paraffin deposition can include the use of plastic or coated pipes, or other low-friction, smooth surfaces on equipment.

Examples of thermal treatments include, but are not limited to, steaming, hot watering and/or hot oiling.

Examples of chemical paraffin treatments include, but are not limited to, non-biological (e.g., produced by chemical purification, isolation, and/or synthesis) surfactants, condensates, solvents and/or inhibitors.

Surfactants are surface active agents having two functional groups, namely a hydrophilic (water-soluble) or polar group and a hydrophobic (oil-soluble) or non-polar group. The hydrophobic group is usually a long hydrocarbon chain (C8-C18), which may or may not be branched, while the hydrophilic group is formed by moieties such as carboxylates, sulfates, sulfonates (anionic), alcohols, polyoxyethylenated chains (nonionic) and quaternary ammonium salts (cationic).

Non-biological surfactants according to the subject compositions and methods include, but are not limited to: anionic surfactants, ammonium lauryl sulfate, sodium lauryl sulfate (also called SDS, sodium dodecyl sulfate), alkyl-ether sulfates sodium laureth sulfate (also known as sodium lauryl ether sulfate (SLES)), sodium myreth sulfate; docusates, dioctyl sodium sulfosuccinate, perfluorooctanesulfonate (PFOS), perfluorobutanesulfonate, linear alkylbenzene sulfonates (LABs), alkyl-aryl ether phosphates, alkyl ether phosphate; carboxylates, alkyl carboxylates (soaps), sodium stearate, sodium lauroyl sarcosinate, carboxylate-based fluorosurfactants, perfluorononanoate, perfluorooctanoate; cationic surfactants, pH-dependent primary, secondary, or tertiary amines, octenidine dihydrochloride, permanently charged quaternary ammonium cations, alkyltrimethylammonium salts, cetyl trimethylammonium bromide (CTAB) (a.k.a. hexadecyl trimethyl ammonium bromide), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldi-methylammonium bromide (DODAB); zwitterionic (amphoteric) surfactants, sultaines CHAPS (3-[(3-Cholamidopropyl)dimethylammonio]-1-propanesulfonate), cocamidopropyl hydroxysultaine, betaines, cocamidopropyl betaine, phosphatidylserine, phosphatidylethanolamine, phosphatidylcholine, sphingomyelins; nonionic surfactants, ethoxylate, long chain alcohols, fatty alcohols, cetyl alcohol, stearyl alcohol, cetostearyl alcohol, oleyl alcohol, polyoxyethylene glycol alkyl ethers (Brij): $CH3-(CH2)10-16-(O—C2H4)1-25-OH$ (octaethylene glycol monododecyl ether, pentaethylene glycol monododecyl ether), polyoxypropylene glycol alkyl ethers: $CH3-(CH2)10-16-(O—C3H6)1-25-OH$, glucoside alkyl ethers: $CH3-(CH2)10-16-(O-Glucoside)1-3-OH$ (decyl glucoside, lauryl glucoside, octyl glucoside), polyoxyethylene glycol octylphenol ethers: $C8H17-(C6H4)-(O—C2H4)1-25-OH$ (Triton X-100), polyoxyethylene glycol alkylphenol ethers: $C9H19-(C6H4)O—(—C2H4)1-25-OH$ (nonoxynol-9), glycerol alkyl esters (glyceryl laurate), polyoxyethylene glycol sorbitan alkyl esters (polysorbate), sorbitan alkyl esters (spans), cocamide MEA, cocamide DEA, dodecyldimethylamine oxide, copolymers of polyethylene glycol and polypropylene glycol (poloxamers), and polyethoxylated tallow amine (POEA).

Anionic surfactants contain anionic functional groups at their head, such as sulfate, sulfonate, phosphate, and carboxylates. Prominent alkyl sulfates include ammonium lauryl sulfate, sodium lauryl sulfate (also called SDS, sodium dodecyl sulfate) and the related alkyl-ether sulfates sodium laureth sulfate, also known as sodium lauryl ether sulfate (SLES), and sodium myreth sulfate. Carboxylates are the most common surfactants and comprise the alkyl carboxylates (soaps), such as sodium stearate.

Surfactants with cationic head groups include: pH-dependent primary, secondary, or tertiary amines; octenidine dihydrochloride; permanently charged quaternary ammonium cations such as alkyltrimethylammonium salts: cetyl trimethylammonium bromide (CTAB) a.k.a. hexadecyl trimethyl ammonium bromide, cetyl trimethylammonium chloride (CTAC); cetylpyridinium chloride (CPC); benzalkonium chloride (BAC); benzethonium chloride (BZT); 5-Bromo-5-nitro-1,3-dioxane; dimethyldioctadecylammonium chloride; cetrimonium bromide; and dioctadecyldi-methylammonium bromide (DODAB).

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates. Zwitterionic surfactants commonly have a phosphate anion with an amine or ammonium, such as is found in the phospholipids phosphatidylserine, phosphatidylethanolamine, phosphatidylcholine, and sphingomyelins.

A surfactant with a non-charged hydrophilic part, e.g. ethoxylate, is non-ionic. Many long chain alcohols exhibit some surfactant properties.

Condensates are low-density mixtures of hydrocarbon liquids present as gaseous components in raw natural gas that will condense to liquid state depending on decrease in temperature and changes in pressure. Gas condensates generally comprise propane, butane, pentane, hexane, and other compounds. Condensates can be used as chemical treatments, including as solvents, in paraffin removal in oil and gas wells and equipment.

Examples of solvents and/or condensates according to the subject compositions and methods include, but are not limited to, aliphatic and/or terpenes, terpenoids, acetates, ionic liquids, alcohols, aromatic hydrocarbons, ketones, acetic acid, kerosene, gasoline, diesel, benzene, ethyl benzenes, propyl benzenes, butyl benzenes, toluene, ethyl toluenes, xylene, pentane, alkylene amines, dioxane, carbon disulfide, mesitylene, cumene, cymenes, saturated aliphatic and/or alicyclic hydrocarbons, naphtha, naphthenes, cyclohexane, decalin, tetralin, heptane, octane, cyclooctane, isooctane, cycloheptane, turpentine, carbon tetrachloride, ether alcohol, pinene, dialkyl ether and/or any combination thereof.

In one embodiment, the subject methods can be utilized alongside and/or in combination with enzyme treatments for hydrocarbon deposit removal and/or enhanced oil recovery. Enzymes are typically divided into six classes: oxidoreductases, transferases, hydrolases, lyases, isomerases and ligases. Each class is further divided into subclasses and by action. Specific subclasses of enzymes according to the subject invention include, but are not limited to, proteases, amylases, glycosidases, cellulases, glucosidases, glucanases, galactosidases, moannosidases, sucrases, dextranases, hydrolases, methyltransferases, phosphorylases, dehydrogenases (e.g., glucose dehydrogenase, alcohol dehydrogenase), oxygenases (e.g., alkane oxygenases, methane monooxygenases, dioxygenases), hydroxylases (e.g., alkane hydroxylase), esterases, lipases, ligninases, mannanases, oxidases, laccases, tyrosinases, cytochrome P450 enzymes, peroxidases (e.g., chloroperoxidase and other haloperoxidasese), lactases, extracellular enzymes from *Aspergillus* spp. and other microbial species (e.g., lipases from *Bacillus subtilis, B. licheniformis, B. amyloliquefaciens, Serratia marcescens, Pseudomonas aeruginosa,* and *Staphylococcus aureus*) and other enzyme-based products known in the oil and gas industry.

Production of Microorganisms

The subject invention provides methods for cultivation of microorganisms and production of microbial metabolites and/or other by-products of microbial growth. In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

In certain embodiments, a microbe growth facility produces fresh, high-density microorganisms and/or microbial growth by-products of interest on a desired scale. The microbe growth facility may be located at or near the site of application, or at a different location. The facility produces high-density microbe-based compositions in batch, quasi-continuous, or continuous cultivation.

In certain embodiments, the microbe growth facilities of the subject invention can be located at or near the location where the microbe-based product will be used (e.g., at or near an oil well) For example, the microbe growth facility may be less than 300, 250, 200, 150, 100, 75, 50, 25, 15, 10, 5, 3, or 1 mile from the location of use.

The microbe growth facilities can produce fresh, microbe-based compositions, comprising the microbes themselves, microbial metabolites, and/or other components of the medium in which the microbes are grown. If desired, the compositions can have a high density of vegetative cells or a mixture of vegetative cells, spores, conidia, mycelia and/or other microbial propagules. Advantageously, the compositions can be tailored for use at a specified location. In one embodiment, the microbe growth facility is located on, or near, a site where the microbe-based products will be used.

Advantageously, in preferred embodiments, the methods of the subject invention harness the power of naturally-occurring local microorganisms and their metabolic by-products to improve oil production, transmission and/or refining. Local microbes can be identified based on, for example, salt tolerance, ability to grow at high temperatures, and the use of genetic identification of the sequences described herein.

The microbe growth facilities provide manufacturing versatility by their ability to tailor the microbe-based products to improve synergies with destination geographies. The microbe growth facilities may operate off the grid by utilizing, for example, solar, wind and/or hydroelectric power. Thus, the microbe-based compositions can be produced in remote locations.

The growth vessel used for growing microorganisms can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of microbes in a sample. The technique can also provide an index by which different environments or treatments can be compared.

In one embodiment, the cultivation utilizes a medium supplemented with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

In one embodiment, the cultivation supplies oxygenation to the growing culture. One embodiment utilizes slow motion of air to remove low-oxygen containing air and introduce oxygenated air. In the case of submerged fermentation, the oxygenated air may be ambient air supplemented daily through mechanisms including impellers for mechanical agitation of the liquid, and air spargers for supplying bubbles of gas to the liquid for dissolution of oxygen into the liquid.

In one embodiment, the cultivation utilizes a medium supplemented with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, isopropyl, propanol, butanol, pentanol, hexanol, isobutanol, and/or glycerol; fats and oils such as soybean oil, rice bran oil, canola oil, olive oil, corn oil, sesame oil, and/or linseed oil; etc. These carbon sources may be used independently or in a combination of two or more.

In one embodiment, the method comprises use of two carbon sources, one of which is a saturated oil selected from canola, vegetable, corn, coconut, olive, or any other oil suitable for use in, for example, cooking. In a specific embodiment, the saturated oil is 15% canola oil or discarded oil that has been used for cooking.

In one embodiment, the microorganisms can be grown on a solid or semi-solid substrate, such as, for example, corn, wheat, soybean, chickpeas, beans, oatmeal, pasta, rice, and/or flours or meals of any of these or other similar substances.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, sodium chloride and/or sodium carbonate. These inorganic salts may be used independently or in a combination of two or more.

In some embodiments, the method for cultivation may further comprise adding additional acids and/or antimicrobials in the liquid medium before and/or during the cultivation process. Antimicrobial agents or antibiotics are used for protecting the culture against contamination. Additionally, antifoaming agents may also be added to prevent the formation and/or accumulation of foam during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

In one embodiment, the method for cultivation of microorganisms is carried out at about 50 to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control undesirable bacterial growth.

In one embodiment, the subject invention provides methods of producing a microbial metabolite by cultivating a microbe strain of the subject invention under conditions appropriate for growth and production of the metabolite; and, optionally, purifying the metabolite. In a specific embodiment, the metabolite is a biosurfactant. The metabolite may also be, for example, solvents, acids, ethanol, lactic acid, manno-proteins, beta-glucan, proteins, amino acids, peptides, metabolic intermediates, polyunsaturated fatty acids, and lipids. The metabolite content produced by the method can be, for example, at least 20%, 30%, 40%, 50%, 60%, 70%, 80%, or 90%.

The biomass content of the fermentation medium may be, for example from 5 g/l to 180 g/l or more, or from 10 g/i to 150 g/l.

The microbial growth by-product produced by microorganisms of interest may be retained in the microorganisms or secreted into the growth medium. In another embodiment, the method for producing microbial growth by-product may further comprise steps of concentrating and purifying the microbial growth by-product of interest. In a further embodiment, the medium may contain compounds that stabilize the activity of microbial growth by-product.

The method for cultivation of microorganisms and production of the microbial by-products can be performed in a batch, quasi-continuous, or continuous processes.

In one embodiment, all of the microbial cultivation composition is removed upon the completion of the cultivation (e.g., upon, for example, achieving a desired cell density, or density of a specified metabolite). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a microbe-free medium or contain cells, spores, mycelia, conidia or other microbial propagules. In this manner, a quasi-continuous system is created.

Advantageously, the methods of cultivation do not require complicated equipment or high energy consumption. The microorganisms of interest can be cultivated at small or large scale on site and utilized, even being still-mixed with their media. Similarly, the microbial metabolites can also be produced at large quantities at the site of need.

Because, in certain embodiments, the microbe-based products can be generated locally, without resort to the microorganism stabilization, preservation, storage and transportation processes of conventional microbial production, a much higher density of live microbes, spores, mycelia, conidia or other microbial propagules can be generated, thereby requiring a smaller volume of the microbe-based product for use in the on-site application or which allows much higher density microbial applications where necessary to achieve the desired efficacy. This allows for a scaled-down bioreactor (e.g., smaller fermentation tank, smaller supplies of starter material, nutrients and pH control agents), which makes the system efficient. Local generation of the microbe-based product also facilitates the inclusion of the growth medium in the product. The medium can contain agents produced during the fermentation that are particularly well-suited for local use.

Locally-produced high density, robust cultures of microbes are more effective in the field than those that have undergone vegetative cell stabilization, have been sporulated or have sat in the supply chain for some time. The microbe-based products of the subject invention are particularly advantageous compared to traditional products wherein cells, spores, mycelia, conidia and/or other microbial propagules have been separated from metabolites and nutrients present in the fermentation growth media. Reduced transportation times allow for the production and delivery of fresh batches of microbes and/or their metabolites at the time and volume as required by local demand.

Advantageously, local microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell- and/or propagule-count product and the associated growth medium and metabolites in which the microbes are originally grown.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

Preparation of Microbe-Based Products

The subject invention provides microbe-based products (e.g., yeast fermentation products) for use in removing contaminants (e.g., paraffin) from oil wells, oil production equipment, and subterranean formations. One microbe-based product of the subject invention is simply the fermentation medium containing the microorganism and/or the microbial metabolites produced by the microorganism and/or any residual nutrients. The product of fermentation may be used directly without extraction or purification. If desired, extraction and purification can be easily achieved using standard extraction and/or purification methods or techniques described in the literature.

In one embodiment, a first yeast fermentation product, designated as "Star 3+," can be obtained via cultivation of a yeast, e.g., *Wickerhamomyces anomalus*, using a modified form of solid state fermentation. The culture can be grown on a substrate with ample surface area onto which the yeasts can attach and propagate, such as, for example, rice, soybeans, chickpeas, pasta, oatmeal or beans. The entire fermentation medium with yeast cells growing throughout, and any growth by-products thereof (e.g., enzymes, solvents, and/or biosurfactants), can be harvested after, for example, 3-5 days of cultivation at 25-30° C. The culture can be blended with the substrate, milled and/or micronized, and optionally, dried. This comprises the Star 3+ product. The composition, which can comprise $10^{10}$ to $10^{12}$ cells/gram, can be diluted, for example, up to 10, 50, 100, 500, or 1,000 times prior to being mixed with other components.

In an alternative embodiment, the first yeast fermentation product is obtained using submerged fermentation, wherein the yeast fermentation product comprises liquid broth comprising cells and any yeast growth by-products. A liquid medium containing necessary sources of carbon, nitrogen, minerals and optionally, antimicrobial substances to prevent contaminating bacterial growth can be used. The culture can be grown with an additional carbon source, particularly, a saturated oil (e.g., 15% canola oil, or used cooking vegetable oil). Typically, the pH begins at 5.0-5.5, then decreases to 3.0-3.5, where it is stabilized. The fermentation broth with cells and yeast growth by-products, which can be harvested after, for example, 24-72 hours of cultivation at 25-30° C., comprises this alternative form of the Star 3+ product.

In one embodiment, a second yeast fermentation product can be obtained via submerged cultivation of a biosurfactant-producing yeast, e.g., *Starmerella bombicola*. This yeast is an effective producer of glycolipid biosurfactants, such as SLP. The fermentation broth after 5 days of cultivation at 25° C. can contain the yeast cell suspension and, for example, 150 g/L or more of SLP.

The second yeast fermentation can be further modified if less biosurfactant is desired in the composition. For example, fermentation of *S. bombicola* results in separation of the SLP into a distinguishable layer. This SLP layer can be removed and the residual liquid and biomass, which can still contain 1-4 g/L of residual SLP, can then be utilized a in the subject composition.

The microorganisms in the microbe-based product may be in an active or inactive form. In preferred embodiments, the microbes are inactivated prior to adding to the compositions of the subject invention.

The microbe-based products may be used without further stabilization, preservation, and storage. Advantageously, direct usage of these microbe-based products preserves a high viability of the microorganisms up until inactivation, reduces the possibility of contamination from foreign agents and undesirable microorganisms, and maintains the activity of the by-products of microbial growth.

The microbes and/or medium (e.g., broth or solid substrate) resulting from the microbial growth can be removed from the growth vessel and transferred via, for example, piping for immediate use.

In one embodiment, the microbe-based product is simply the growth by-products of the microorganism. For example, biosurfactants produced by a microorganism can be collected from a submerged fermentation vessel in crude form, comprising, for example about 0.001% to about 99% pure biosurfactant in liquid broth.

In other embodiments, the microbe-based product (microbes, medium, or microbes and medium) can be placed in containers of appropriate size, taking into consideration, for example, the intended use, the contemplated method of application, the size of the fermentation vessel, and any mode of transportation from microbe growth facility to the location of use. Thus, the containers into which the microbe-based composition is placed may be, for example, from 1 gallon to 1,000 gallons or more. In other embodiments the containers are 2 gallons, 5 gallons, 25 gallons, or larger.

In one embodiment, the yeast fermentation product according to the subject composition comprises a yeast strain and/or growth by-products thereof.

In certain embodiments, use of yeast fermentation products according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of biopolymer beta-glucan (an emulsifier) in yeast cell walls. Additionally, the yeast fermentation product further can comprise biosurfactants in the culture, which are capable of reducing both surface and interfacial tension, and other metabolites (e.g., lactic acid, ethyl acetate, ethanol, etc.) in the culture.

Upon harvesting, for example, the yeast fermentation product, from the growth vessels, further components can be added as the harvested product is placed into containers and/or piped (or otherwise transported for use). The additives can be, for example, buffers, carriers, other microbe-based compositions produced at the same or different facility, viscosity modifiers, preservatives, nutrients for microbe growth, tracking agents, solvents, biocides, other microbes and other ingredients specific for an intended use.

Other suitable additives, which may be contained in the formulations according to the invention, include substances that are customarily used for such preparations. Examples of such additives include surfactants, emulsifying agents, lubricants, buffering agents, solubility controlling agents, pH adjusting agents, preservatives, stabilizers and ultra-violet light resistant agents.

In one embodiment, the product may further comprise buffering agents including organic and amino acids or their salts. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid or a mixture.

In one embodiment, additional components such as an aqueous preparation of a salt such as sodium bicarbonate or carbonate, sodium sulfate, sodium phosphate, sodium biphosphate, can be included in the formulation.

Advantageously, in accordance with the subject invention, the microbe-based product may comprise medium in which the microbes were grown. The product may be, for example, at least, by weight, 1%, 5%, 10%, 25%, 50%, 75%, or 100% growth medium. The amount of biomass in the product, by weight, may be, for example, anywhere from 0% to 100%, 10% to 90%, 20% to 80%, or 30% to 70%, inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

Advantageously, the subject products can be used to simultaneously enhance oil recovery (e.g., by stimulating an oil well), while removing paraffin and other contaminants from oil production equipment and oil-bearing formations.

Microbial Strains

The microorganisms useful according to the subject invention can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In preferred embodiments, the microorganism is any yeast or fungus, including, for example, *Acaulospora, Aspergillus, Aureobasidium* (e.g., *A. pullulans*), *Blakeslea, Candida* (e.g., *C. albicans, C. apicola*), *Debaryomyces* (e.g., *D. hansenii*), *Entomophthora, Fusarium, Hanseniaspora* (e.g., *H. uvarum*), *Hansenula, Issatchenkia, Kluyveromyces, Mortierella, Mucor* (e.g., *M. piriformis*), *Penicillium, Phythium, Phycomyces, Pichia* (e.g., *P. anomala, P. guielliermondii, P. occidentalis, P. kudriavzevii*), *Pseudozyma* (e.g., *P. aphidis*), *Rhizopus, Saccharomyces* (*S. cerevisiae, S. boulardii sequela, S. torula*), *Starmerella* (e.g., *S. bombicola*), *Torulopsis, Thraustochytrium, Trichoderma* (e.g., *T. reesei, T. harzianum, T. virens*), *Ustilago* (e.g., *U. maydis*), *Wickerhamomyces* (e.g., *W. anomalus*), *Williopsis*, and/or *Zygosaccharomyces* (e.g., *Z. bailii*).

In one embodiment, the microbial strain is a *Pichia* yeast, or a related species selected from *Wickerhamomyces anomalus* (*Pichia anomala*), *Meyerozyma guilliermondii* (*Pichia guilliermondii*) and *Pichia kudriavzevii*. In one embodiment, the yeast or fungus is *Starmerella bombicola, Pseudozyma aphidis*, or *Saccharomyces cerevisiae*.

In one embodiment, the yeast is *Wickerhamomyces anomalus*. *W. anomalus* produces a killer toxin comprising exo-β-1,3-glucanase. Additionally, *W. anomalus* produces biosurfactants that are capable of reducing surface/interfacial tension of water, as well as various other useful solvents, enzymes and other metabolites, such as, for example, phytase, glycosidases, ethyl acetate, acetic acid, lactic acid, and ethanol.

In one embodiment, the yeast is *Starmerella bombicola*, which is an effective producer of, for example, glycolipid biosurfactants.

In one embodiment, the yeast is *Meyerozyma guilliermondii*, which is an effective producer of, for example, glycolipid biosurfactants and/or esterified fatty acid compounds.

Other microbial strains can be used in accordance with the subject invention, including, for example, any other yeast and/or fungal strains having high concentrations of mannoprotein and/or beta-glucan in their cell walls and/or that are capable of producing biosurfactants and other metabolites such as, e.g., lactic acid, ethyl acetate and ethanol.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Cultivation of First Yeast Fermentation Product

The first yeast fermentation product according to the subject invention, designated as "Star 3+," can be obtained via cultivation of, e.g., *Wickerhamomyces anomalus*, using a solid or semi-solid substrate.

For example, corn flour, chickpeas, soybeans, rice or other similar foodstuff items can be mixed with nutrient medium seeded with, for example, $1\times10^{12}$ cells/ml of *W. anomalus*. After about 3-5 days of growth at about 25-35° C., preferably, 28° C., the yeast and any growth by-products thereof (e.g., enzymes, solvents, and/or biosurfactants) can either be washed out and utilized in liquid form, or the yeast and substrate can be milled, blended and/or micronized, and optionally dried. The yeasts can be inactivated by, for example, thermal means.

The product can be diluted by 10-1,000 times prior to mixing with other composition ingredients. When more than one strain of microorganism is utilized in the composition, the different strains of microbe are produced and stored separately and then mixed together prior to use.

Example 2—Crude Oil Recovery from Aged Sand

Aged sand used for crude oil recovery is prepared by mixing sand with crude oil and "aging" the mixture for 3 days at 60° C. Six test tubes are filled with the mixture. The crude oil content in the sand is 18%, or an estimated 3.6 ml per tube. Each tube is treated with 25 mL of a treatment as follows:

1. SLP (50 ml/L); dipentene (50 ml/L); primary amyl acetate (50 ml/L); monoammonium phosphate (10 g/L); sodium citrate (10 g/L); remainder of volume=Star3+.
2. SLP (25 m/L); dipentene (50 ml/L); primary amyl acetate (50 ml/L); monoammonium phosphate (10 g/L); sodium citrate (10 g/L); remainder of volume=Star3+.
3. SLP (50 ml/L); dipentene (50 m/L); primary amyl acetate (50 ml/L); monoammonium phosphate (10 g/L); sodium citrate (10 g/L); isopropyl alcohol (4 ml/L); remainder of volume=Star3+.
4. Same as #3.
5. (Positive control) SLP (5 ml/L); ammonium hydroxide (3 mi/L); isopropyl alcohol (4 ml/L); monoammonium phosphate (2 g/L); mixture of chelating agents (10 g/L); remainder of volume=water.
6. Water.

The amount of oil released from the sands after 22 hours is measured. Due to the non-polar nature of dipentene and primary amyl acetate, which do not dissolve in water, the approximate amount of dipentene and primary amyl acetate present in tubes 1 through 4 (2.5 ml) is subtracted from the estimated oil recovery measurement. The results are as follows:

1. 1.75 ml
2. 2 ml
3. 1.75 ml
4. 1.75 ml
5. 3 ml
6. 0 ml

Treatment number 5 recovered about 80% of the oil from the sand, with number 2 recovering about 55% of the oil.

Example 3—Pour Point Study #1

Crude oil precipitates (i.e., paraffin) extracted from an oil well in Texas, were used to study the capabilities of the subject composition to alter pour point.

To measure the pour point of a sample of the paraffin without treatment, 11 g of paraffin was heated gradually in a hot water bath to a maximum temperature of 87° C. The paraffin was observed for the occurrence of melting throughout the gradual heating. Minimal melting occurred at 87° C., so the pour point was determined to be >87° C.

To measure the pour point of the paraffin with treatment, three separate tests were performed, using the ASTM D97 standard pour point test procedure as a loose guideline. Three samples from the same paraffin were treated with identical amounts of a composition according to the subject invention. The samples were then heated preliminarily for 2 hours at 35° C.

The samples were mixed and then chilled to allow for formation of the paraffin wax crystals, with examination of the samples for flow characteristics occurring at every −3° C. temperature interval. The lowest temperature at which movement of the sample is observed is recorded as the pour point.

The mixture in each sample was observed until it became solid, which occurred at −3° C. This temperature was determined to be the pour point for this particular paraffin when treated with the subject composition. The pour point value was reduced from the pour point measured in the untreated sample.

As shown in FIG. 1, at −3° C., the mixture of paraffin and treatment composition separated into a lower, solid paraffin portion and a top liquid portion. The liquid portion, comprising D-limonene and canola oil, separated from the mixture while it was being chilled and remained in liquid form at the −3° C. temperature.

Example 4—Pour Point Study #2

Paraffinic Texas Permian crude that was treated with the composition of the subject invention was tested for pour point depression. The ASTM D5950 standard test method for pour point of petroleum products (automatic tilt method) was used. The resulting pour point value was about −25° F., or about −32° C.

Example 5—Paraffin Dispersal

A hard, low-grade paraffin crude was sampled from a well in Irion Country, Texas and treated with two formulations (1 and 2) of the subject composition in test tubes. Three replicates (1, 1a, 1b) were performed using Formulation 1, and three replicates were performed using Formulation 2 (2, 2a, 2b).

Formulation 1 comprised: Star 3+ diluted; SLP 10 ml/L; turpentine 50 ml/L; monoammonium phosphate 10 g/L; sodium citrate 10 g/L.

Formulation 2 comprised: Star 3+ diluted; SLP 10 ml/L; turpentine 100 ml/L; monoammonium phosphate 10 g/L; sodium citrate 10 g/L.

Figure 2A:
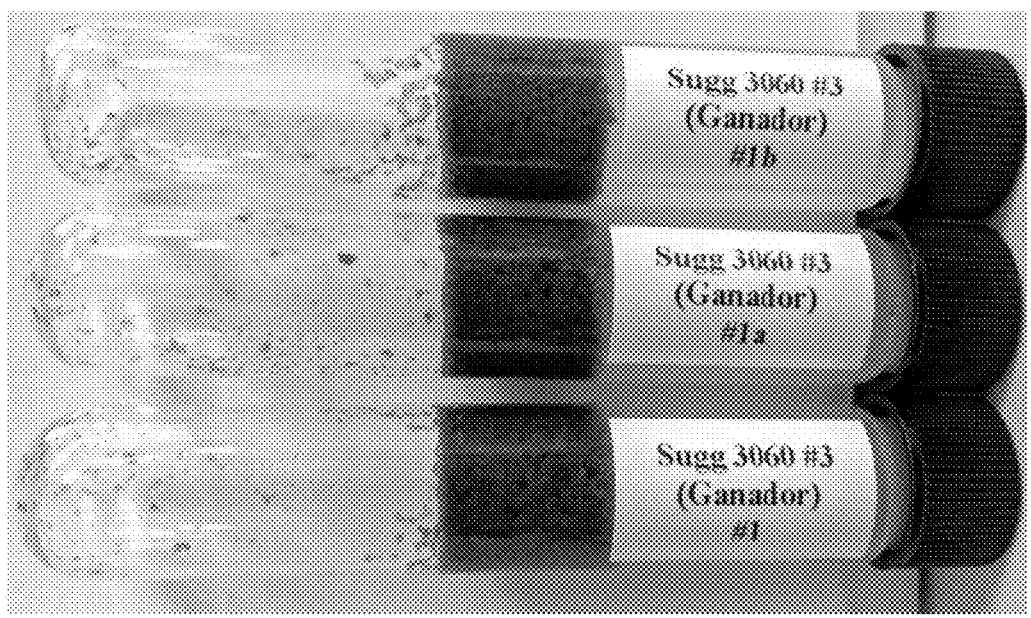
FIGS. 2A-2B show dispersal of a hard paraffin after 2 hours and 4 hours with two formulations of a composition according to embodiments of the subject invention. The formulation used in (B) comprised double the amount of solvent that the formulation used in (A) comprises.
Figure 2B:

The paraffin grade dispersal grade was for each replicate after 2 hours and 4 hours, with grade 5 being fully dispersed paraffin. The results are reported in Tables 1 and 2, below. See also, FIGS. 2A-2B.

TABLE 1

Increase in paraffin grade over 4 hours when treated with Formulation 1.

| | | Grade | | | |
|---|---|---|---|---|---|
| | Time: | 1 hr. | 2 hr. | 3 hr. | 4 hr. |
| 1 | Formulation 1 | | 4 | | 5 |
| 1a | Formulation 1 | | 4 | | 5 |
| 1b | Formulation 1 | | 4 | | 5 |

TABLE 2

Increase in paraffin grade over 4 hours when treated with Formulation 2.

| | | Grade | | | |
|---|---|---|---|---|---|
| | Time: | 1 hr. | 2 hr. | 3 hr. | 4 hr. |
| 2 | Formulation 2 | | 4 | | 5 |
| 2a | Formulation 2 | | 4 | | 5 |
| 2b | Formulation 2 | | 4 | | 5 |

Example 6—Paraffin Dispersal

A very hard paraffin crude (#1) was sampled from a well and treated with a formulation (Formulation 3) of a composition according to an embodiment of the subject invention. The results were compared to other standard paraffin dispersants. Multiple replicates were performed for each treatment.

Formulation 3 comprised: Star3+ in 0.1% oil, diluted; SLP 10 ml/L; dipentene 200 ml/L; sodium citrate 10 g/L; monoammonium phosphate 10 g/L; and purified MEL 5 ml/L.

The paraffin dispersal grade was measured for each replicate. All five replicates of Formulation 3 treatment produced fully dispersed (grade 5) paraffin in only 1 hour.

Figure 3A:
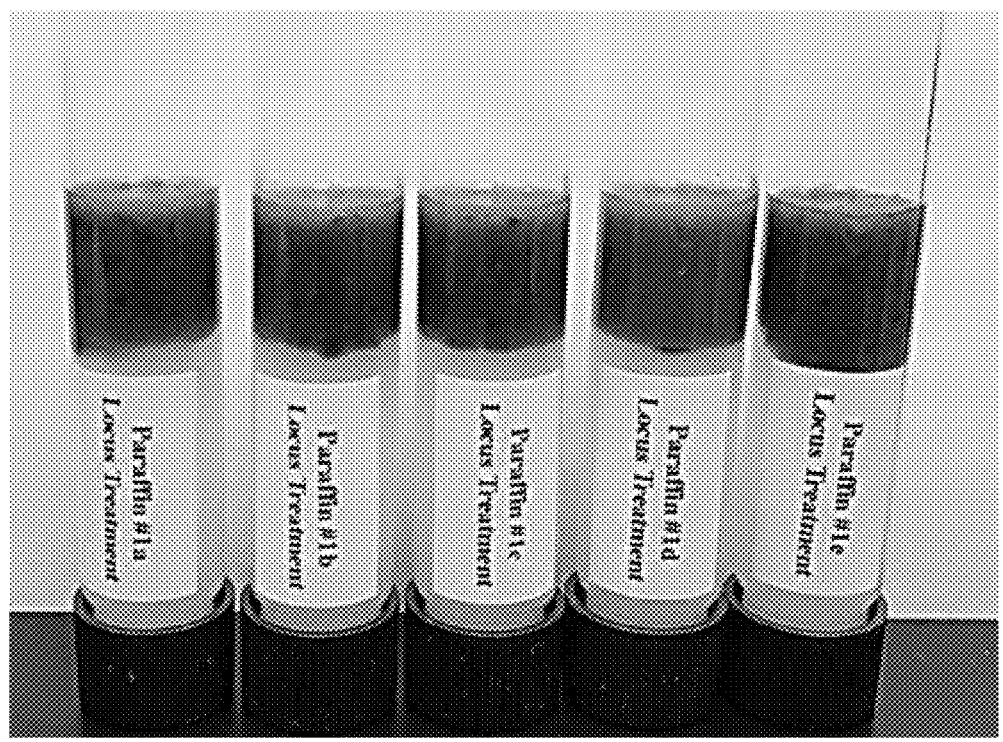
FIGS. 3A-3B show dispersal of a hard paraffin after 1 hour using a composition according to one embodiment of the subject invention (A), as compared to other treatments (B) (water, pentane, xylene, kerosene, condensate).
Figure 3B:
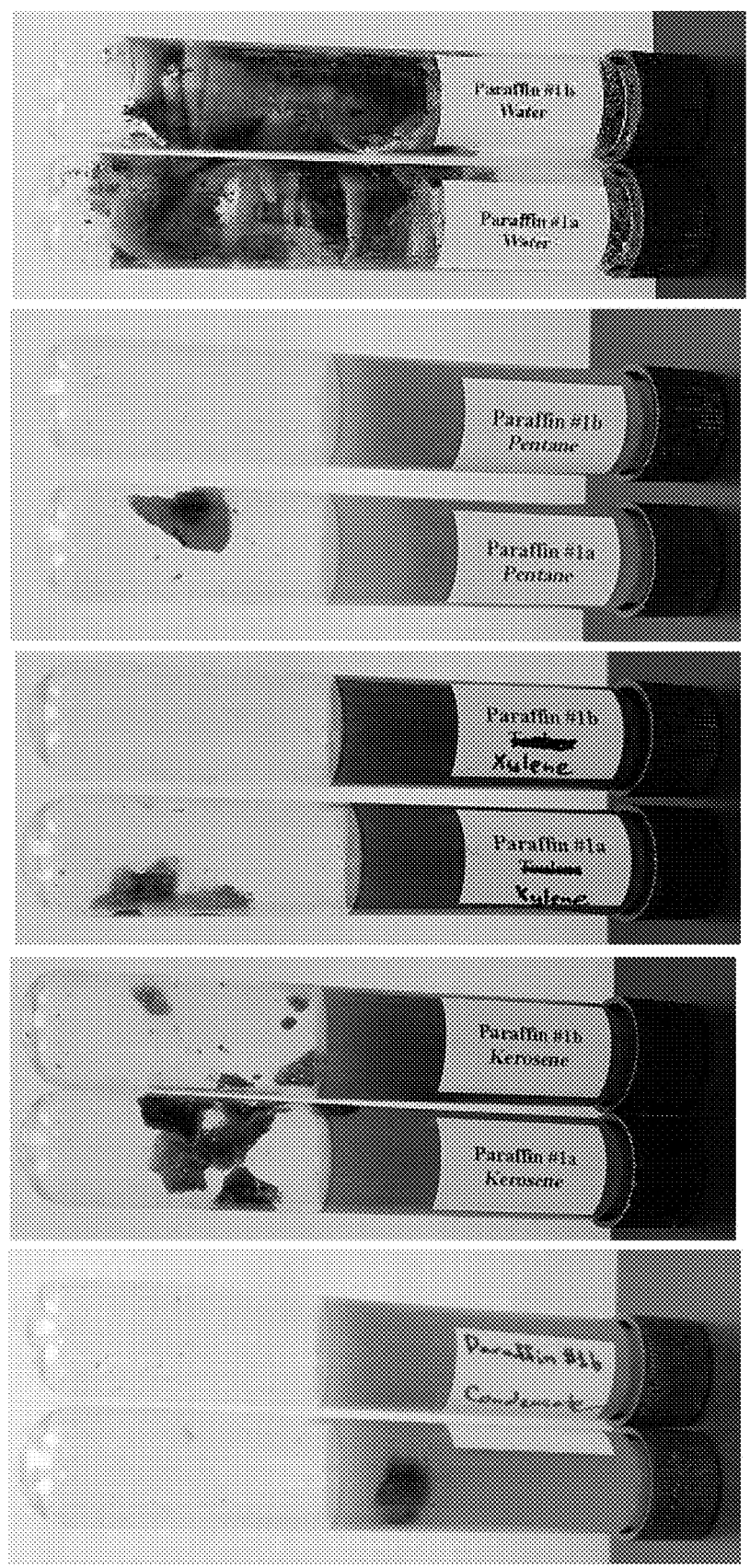

The results are reported in Table 3, below. See also, FIGS. 3A-3B.

TABLE 3

Paraffin #1 dispersal grade over 1 hour.

| Time: | | Grade 1 hr. |
|---|---|---|
| 1a | Formulation 3 | 5 |
| 1b | Formulation 3 | 5 |
| 1c | Formulation 3 | 5 |
| 1d | Formulation 3 | 5 |
| 1e | Formulation 3 | 5 |
| 1a | 100% water | 0 |
| 1b | 100% water | 0 |
| 1a | 100% Xylene | 3.5 |
| 1b | 100% Xylene | 5 |
| 1a | 100% Kerosene | 3 |
| 1b | 100% Kerosene | 4 |
| 1a | 100% Pentane | 4 |
| 1b | 100% Pentane | 5 |
| 1a | Unknown Dispersant A | 2 |
| 1b | Unknown Dispersant A | 2 |
| 1c | Unknown Dispersant A | 2 |
| 1a | Unknown Dispersant B | 1 |
| 1b | Unknown Dispersant B | 1 |
| 1c | Unknown Dispersant B | 1 |
| 1a | Unknown Dispersant C | 1 |
| 1b | Unknown Dispersant C | 1 |
| 1c | Unknown Dispersant C | 1 |
| 1a | Condensate | 4 |
| 1b | Condensate | 5 |

A hard paraffin crude (#2, less hard than #1) was sampled from a well, treated with Formulation 3 and compared to other standard paraffin treatments. Multiple replicates were performed for each treatment.

Figure 4A:
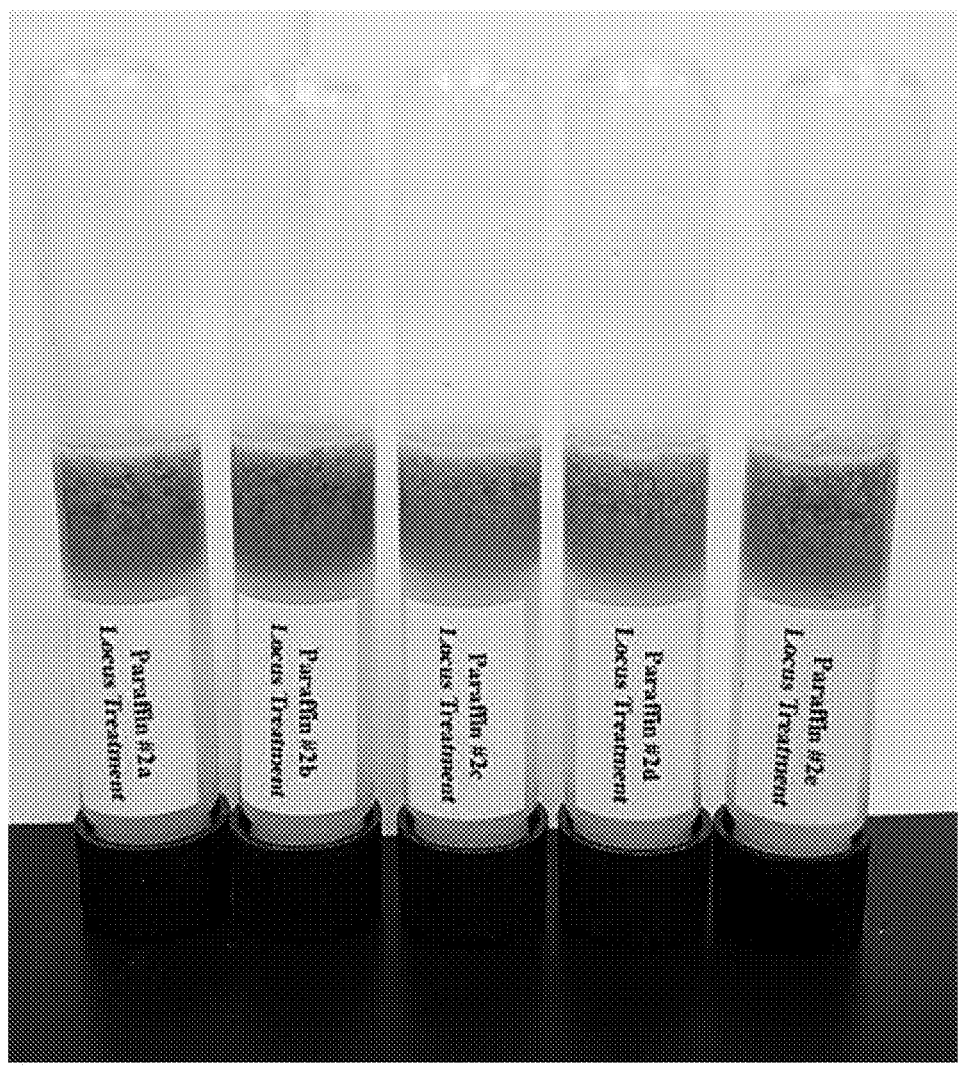
FIGS. 4A-4B show dispersal of a hard paraffin after 2 hours using a composition according to one embodiment of the subject invention (A), as compared to other treatments (B) (water, pentane, xylene, kerosene, condensate).
Figure 4B:

The paraffin dispersal grade was measured for each replicate. All five replicates of Formulation 3 treatment produced fully dispersed (grade 5) paraffin by 2 hours. The results are reported in Table 4, below. See also, FIGS. 4A-4B.

TABLE 4

Paraffin #2 dispersal grade over 2 hours.

| Time: | | Grade 1 hr. | 2 hr. |
|---|---|---|---|
| 2a | Formulation 3 | 4.5 | 5 |
| 2b | Formulation 3 | 5 | |
| 2c | Formulation 3 | 4 | 5 |
| 2d | Formulation 3 | 4.5 | 5 |
| 2e | Formulation 3 | 3.5 | 5 |
| 2a | 100% water | 0 | 0 |
| 2b | 100% water | 0 | 0 |
| 2a | 100% Xylene | 4 | 5 |
| 2b | 100% Xylene | 4 | 5 |
| 2a | 100% Kerosene | 3.5 | 4.5 |
| 2b | 100% Kerosene | 3.5 | 5 |
| 2a | 100% Pentane | 4.5 | 5 |
| 2b | 100% Pentane | 5 | |
| 2a | Unknown Dispersant A | 2 | 2 |
| 2b | Unknown Dispersant A | 2 | 2 |
| 2c | Unknown Dispersant A | 2 | 2 |
| 2a | Unknown Dispersant B | 2 | 2 |
| 2b | Unknown Dispersant B | 2 | 2 |
| 2c | Unknown Dispersant B | 2 | 2 |
| 2a | Unknown Dispersant C | 2 | 2 |
| 2b | Unknown Dispersant C | 2 | 2 |
| 2c | Unknown Dispersant C | 2 | 2 |
| 2a | Condensate | 5 | |
| 2b | Condensate | 5 | |

A hard paraffin crude (#3, less hard than #1 and #2) was sampled from a well, treated Formulation 3 and compared to other standard paraffin treatments. Multiple replicates were performed for each treatment.

Figure 5A:
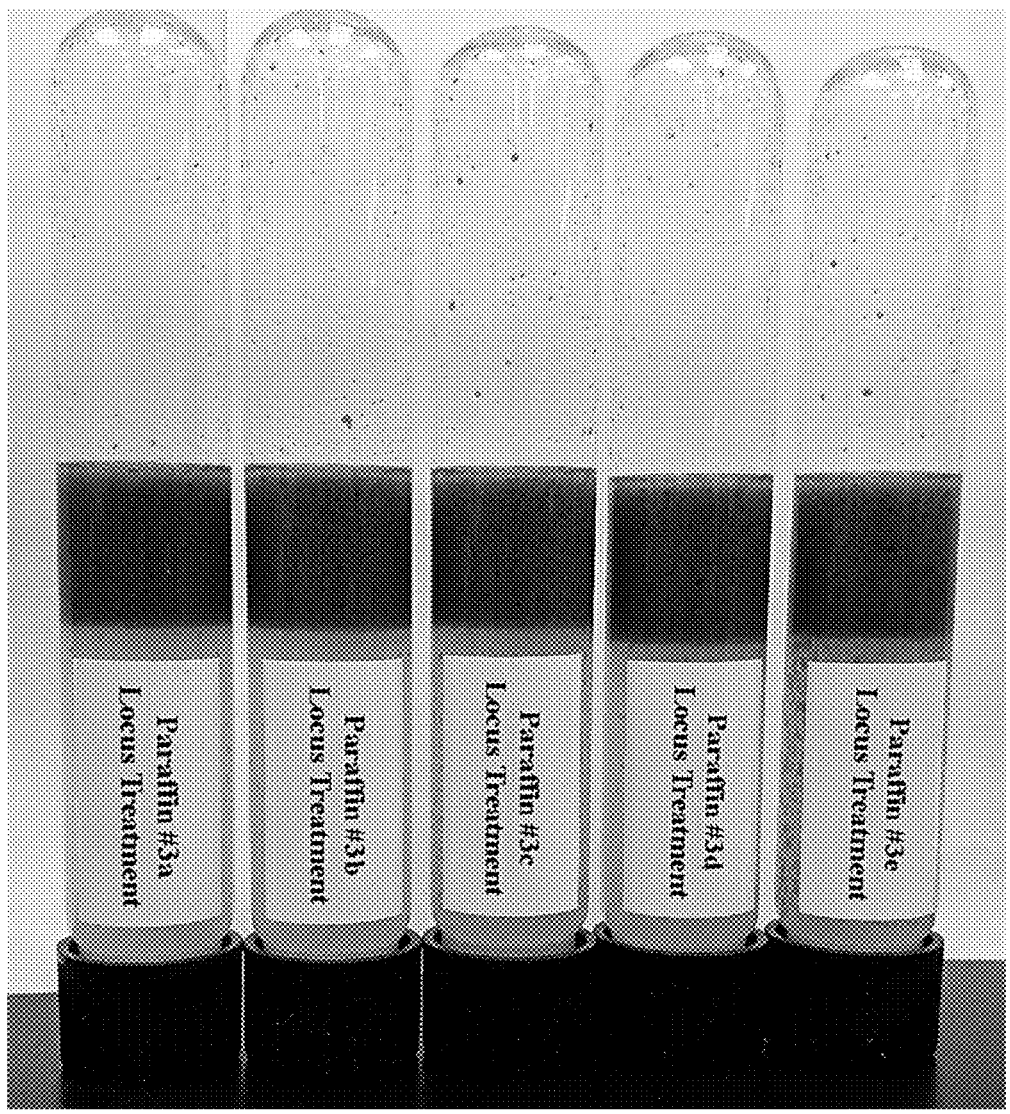
FIGS. 5A-5B show dispersal of a hard paraffin after 1 hour using a composition according to one embodiment of the subject invention (A), as compared to other treatments (B) (water, pentane, xylene, kerosene, condensate).
Figure 5B:
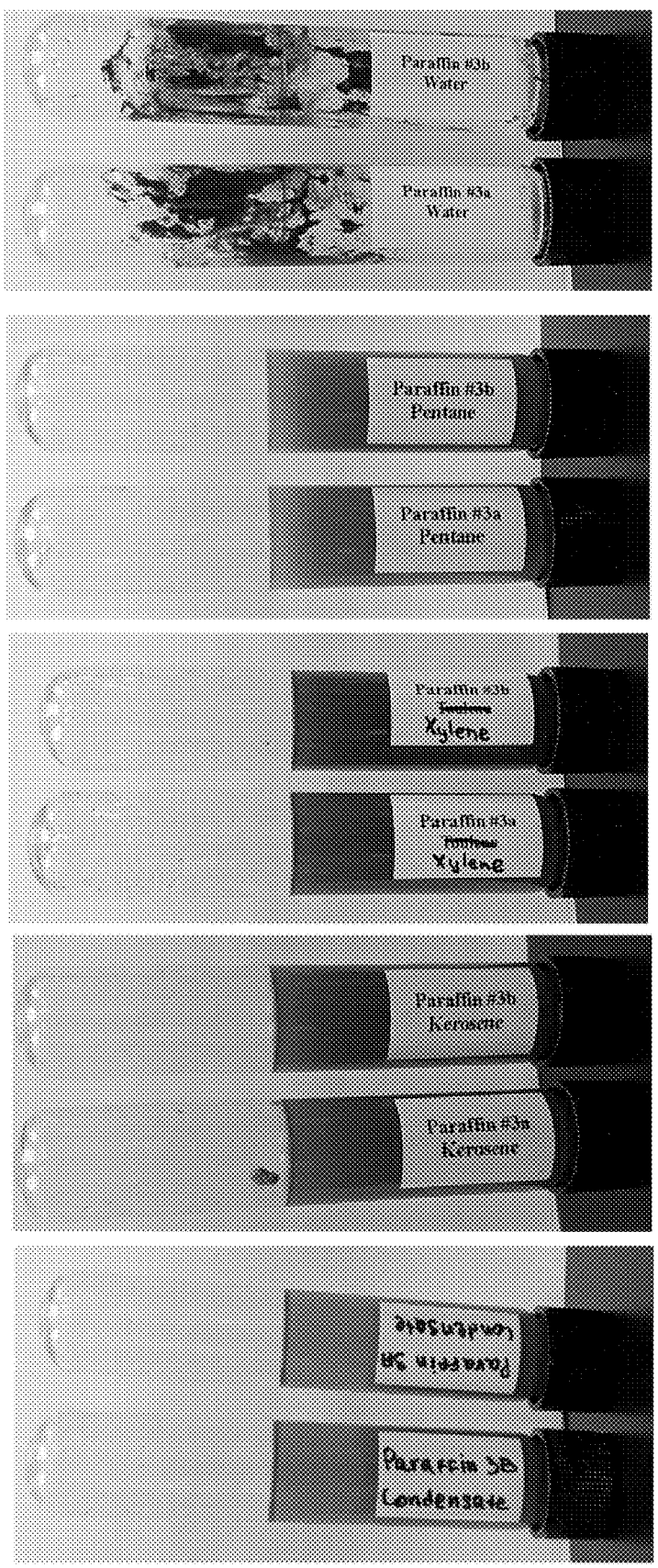

The paraffin dispersal grade was measured for each replicate. All five replicates of Formulation 3 treatment produced fully dispersed (grade 5) paraffin by 1 hour. The results are reported in Table 5, below. See also, FIGS. 5A-5B.

TABLE 5

Paraffin #3 dispersal grade over 1 hour.

| Time: | | Grade 1 hr. |
|---|---|---|
| 3a | Formulation 3 | 5 |
| 3b | Formulation 3 | 5 |
| 3c | Formulation 3 | 5 |
| 3d | Formulation 3 | 5 |
| 3e | Formulation 3 | 5 |
| 3a | 100% water | 0 |
| 3b | 100% water | 0 |
| 3a | 100% Xylene | 5 |
| 3b | 100% Xylene | 5 |
| 3a | 100% Kerosene | 4.5 |
| 3b | 100% Kerosene | 5 |
| 3a | 100% Pentane | 5 |
| 3b | 100% Pentane | 5 |
| 3a | Unknown Dispersant A | 3 |
| 3b | Unknown Dispersant A | 3 |
| 3c | Unknown Dispersant A | 3 |
| 3a | Unknown Dispersant B | 3.5 |
| 3b | Unknown Dispersant B | 3.5 |
| 3c | Unknown Dispersant B | 3.5 |
| 3a | Unknown Dispersant C | 2 |
| 3b | Unknown Dispersant C | 2 |
| 3c | Unknown Dispersant C | 2 |
| 3a | Condensate | 5 |
| 3b | Condensate | 5 |

Example 7—Rust Removal

Figure 6A:
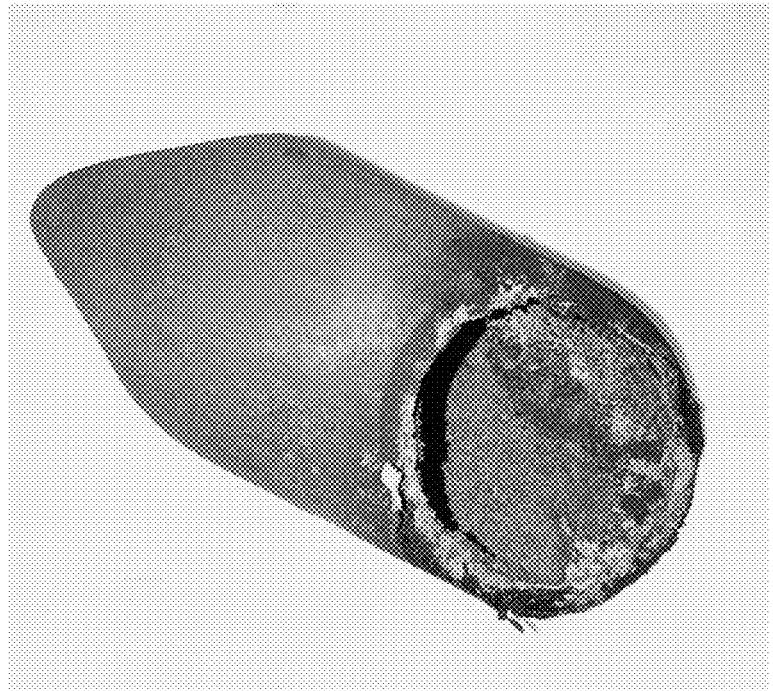
FIGS. 6A-6B show a segment of corroded casing from an oil well in the Appalachian region before treatment (A) and after treatment (B) with a composition according to one embodiment of the subject invention. As shown, the amount of rust on the segment was reduced after 16 hours of soaking in the subject composition.
Figure 6B:
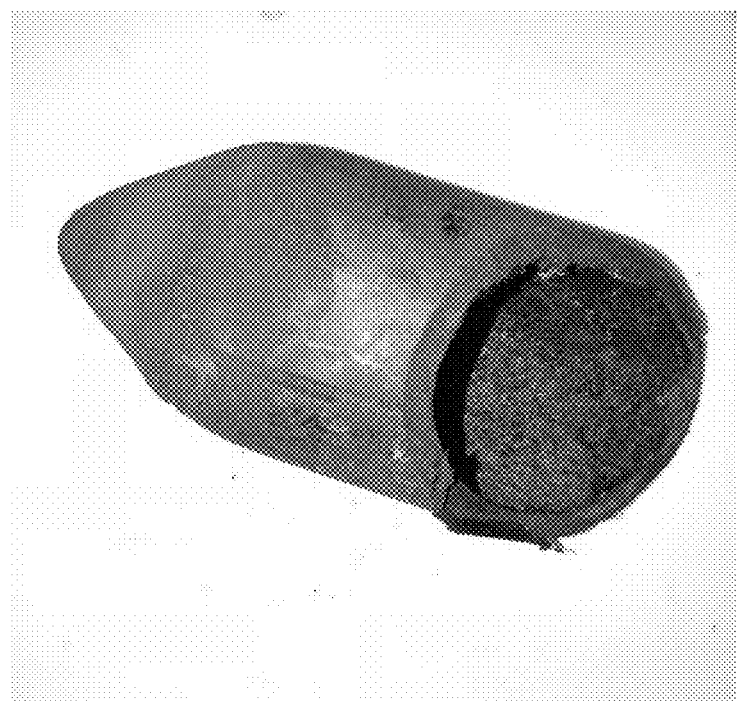

A piece of corroded casing having rust thereon was sampled from an oil well in the Appalachian region. The metal was submerged in a composition according to an embodiment of the subject invention without any agitation for 16 hours. FIG. 6 shows the piece of casing before treatment (6A) and after treatment (6B).

Example 8—Bacterial Growth Inhibition

Gram-positive and Gram-negative bacterial strains were cultivated in nutrient rich broth media with varying concentrations of a composition according to an embodiment of the subject invention in each respective flask (1, 5, and 10% v/v). Initial and final cell concentrations of each flask were calculated in colony forming unit/milliliter (CFU/ml).

For Gram-negative bacteria, 24 hour cultivation ensured maximal cell concentration when cultivated at 35° C. Due to a lack of available shaker space operating at 35° C., the Gram-positive bacteria were cultivated in a shaker at 30° C. Because this was lower than the optimum 35° C. temperature for the particular strain of bacteria, 72 hours of cultivation ensured maximal cell concentration and spore formation at the lower temperature.

TABLE 6

Bacterial inhibition results, Gram-negative bacteria.

| Sample | 0 hr CFU/ml | 24 hr CFU/ml | Fold Increase |
|---|---|---|---|
| B. thailendensis control | $3.6 \times 10^6$ | $9.0 \times 10^9$ | 2,500X |
| B. thailendensis + 1% Composition | $3.7 \times 10^6$ | $5.0 \times 10^9$ | 1,350X |
| B. thailendensis + 5% Composition | $2.0 \times 10^6$ | $4.0 \times 10^8$ | 200X |
| B. thailendensis + 10% Composition | $2.1 \times 10^6$ | $3.8 \times 10^6$ | 2X |

Figure 7A:
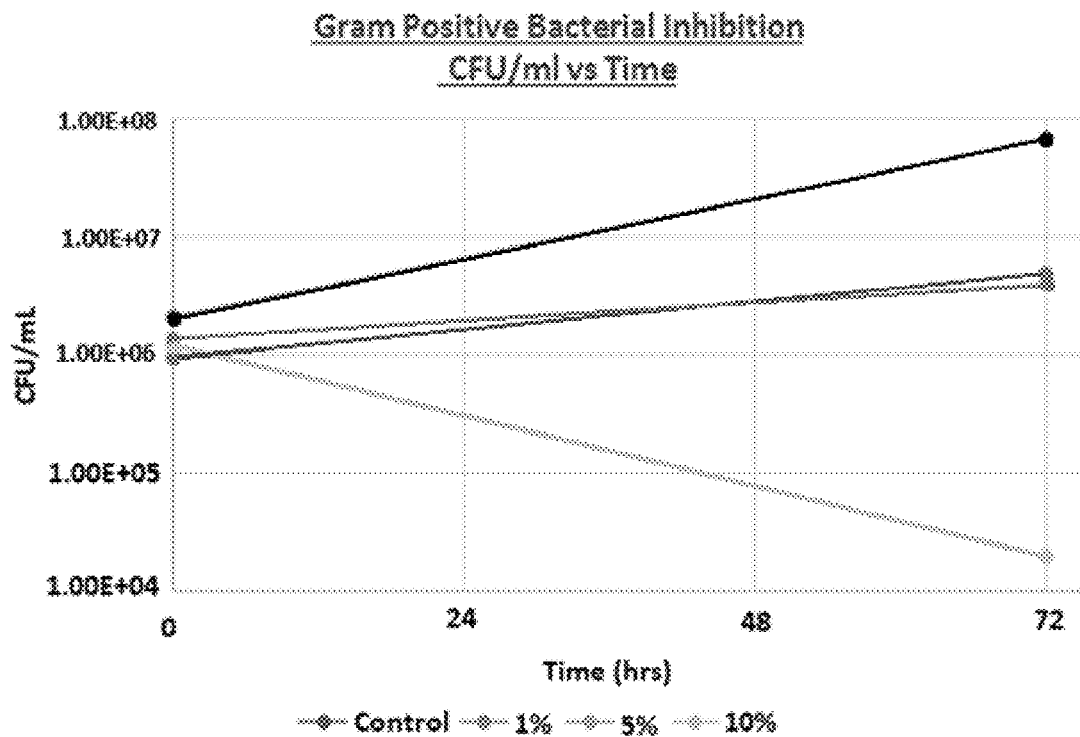
FIGS. 7A-7B show (A) Gram-positive and (B) Gram-negative bacterial inhibition in CFU/ml over time after treatment with a composition according to one embodiment of the subject invention. The darkest, highest line indicates the normal growth of the respective bacteria (control).

The results for inhibition of the Gram-negative bacteria, *Bacillus thailendensis*, are shown in Table 6. Significant growth inhibition was observed as the composition was added at 1, 5, and 10% v/v. FIG. 7A.

Figure 7B:
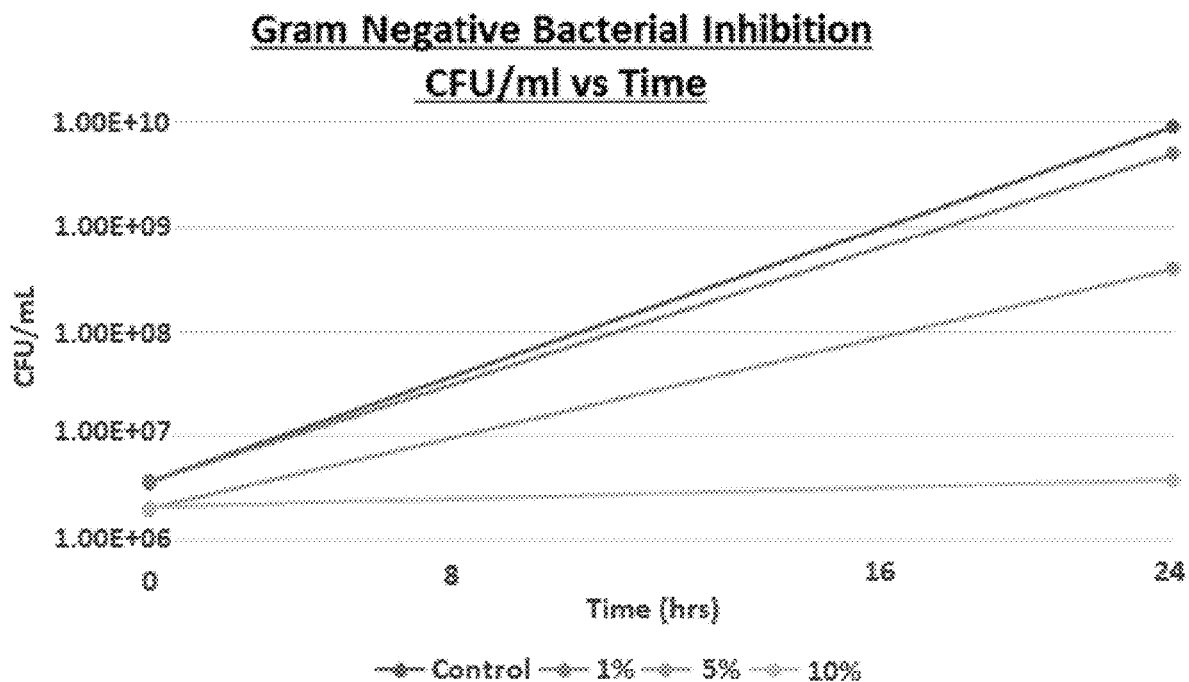

The results for inhibition of the Gram-positive bacteria, *Bacillus subtilis subtilis* "B1," are shown in Table 7. Significant growth inhibition was observed when the composition was added at 1, 5, and 10% v/v. FIG. 7B.

TABLE 7

Bacterial inhibition results, Gram-positive bacteria.

| Sample | 0 hr CFU/ml | 72 hr CFU/ml | Fold Increase |
|---|---|---|---|
| B1 Control | $2.1 \times 10^6$ | $7.0 \times 10^7$ | 33X |
| B1 + 1% Composition | $9.6 \times 10^5$ | $5.0 \times 10^6$ | 5.2X |
| B1 + 5% Composition | $1.4 \times 10^6$ | $4.0 \times 10^6$ | 4X |
| B1 + 10% Composition | $1.2 \times 10^6$ | $2.0 \times 10^4$ | −60X |

Example 9—Biofilm Formation Inhibition—Direct Contact with Composition

*B. subtilis subtilis* was cultivated in a flask for 48 hours at 35° C. in nutrient rich broth to allow for maximal cell concentrations to be reached. 0.1 ml of the mature culture was spread onto 4 sterile nutrient agar plates.

Figure 8A:
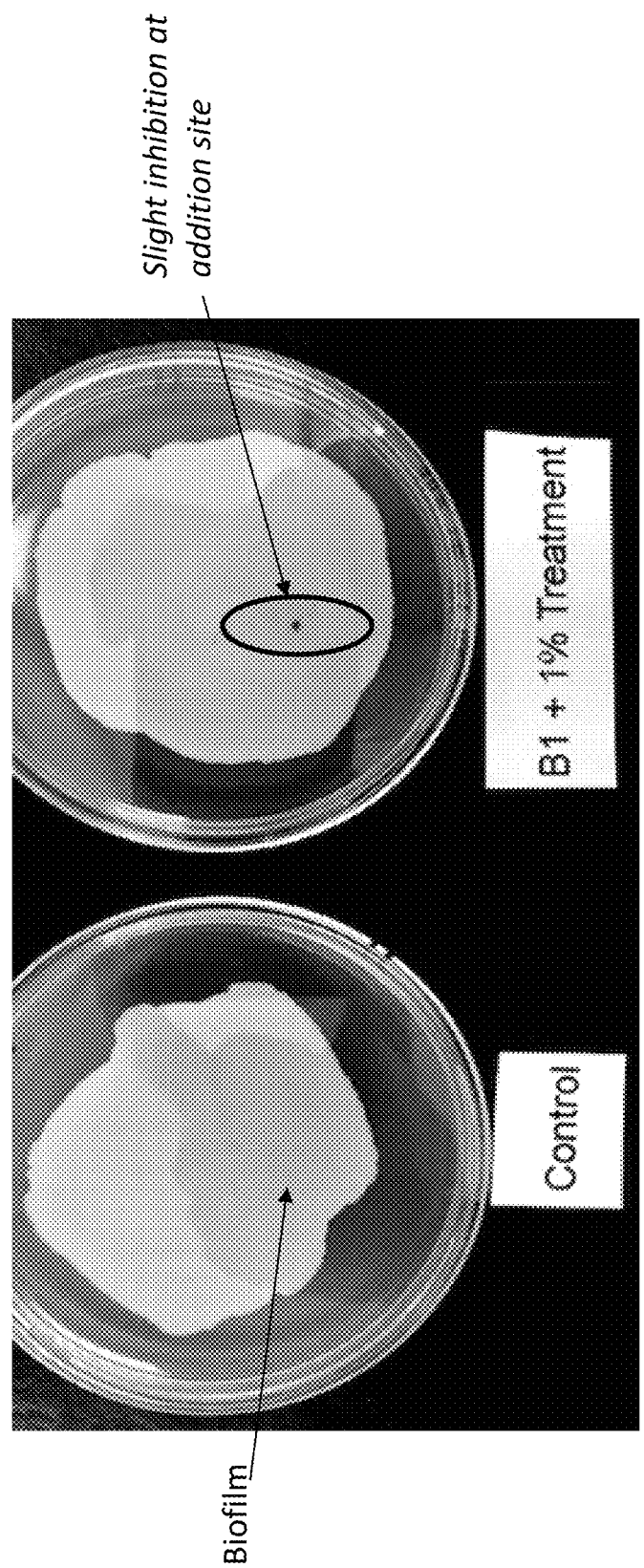
FIGS. 8A-8C show a comparison of biofilm formation inhibition with direct treatment with 1% (A), 5% (B) and 10% v/v (C) dilutions of the subject composition versus control, untreated biofilm. Direct treatment involved adding a composition according to one embodiment of the subject invention directly to the surface of the bacteria.
Figure 8B:
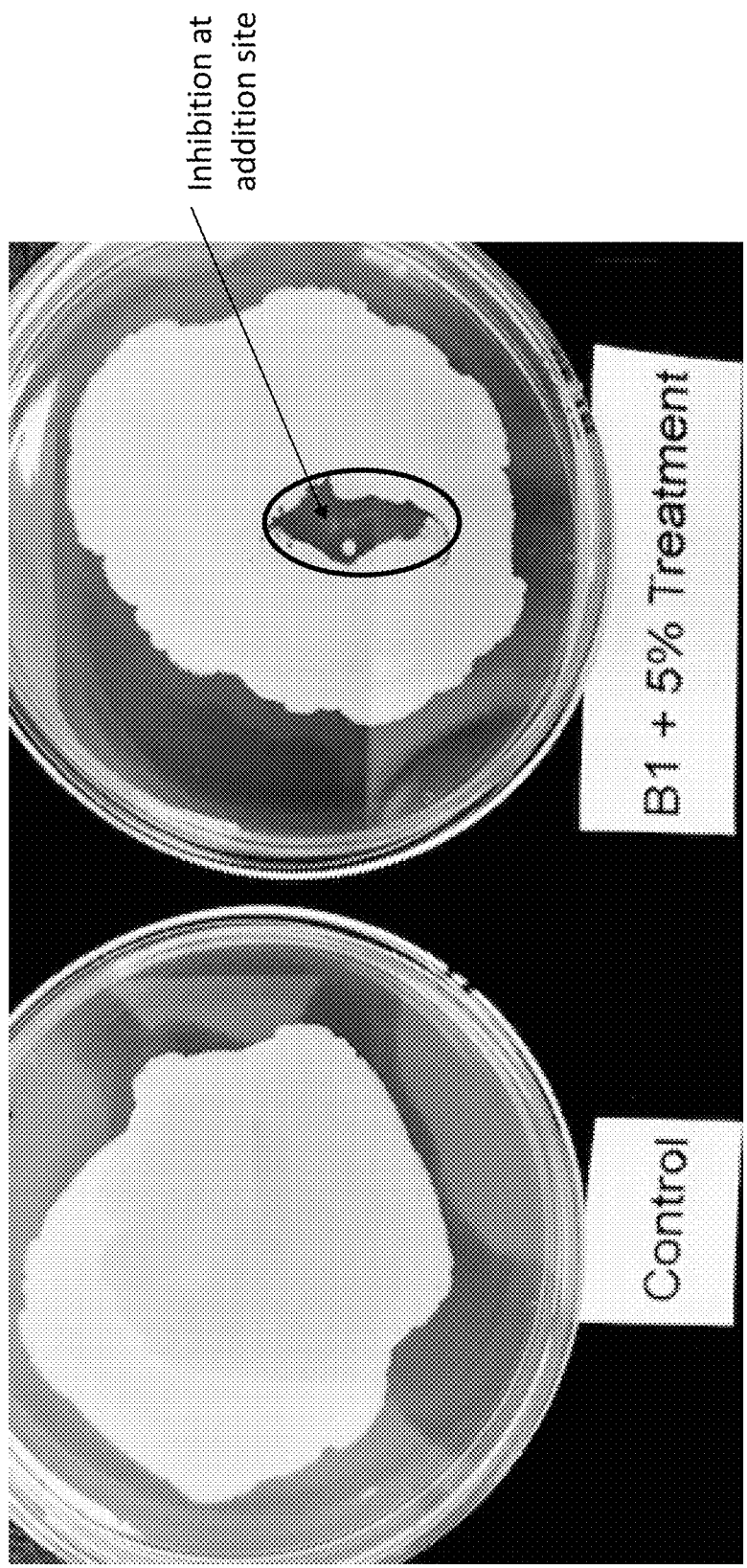
Figure 8C:
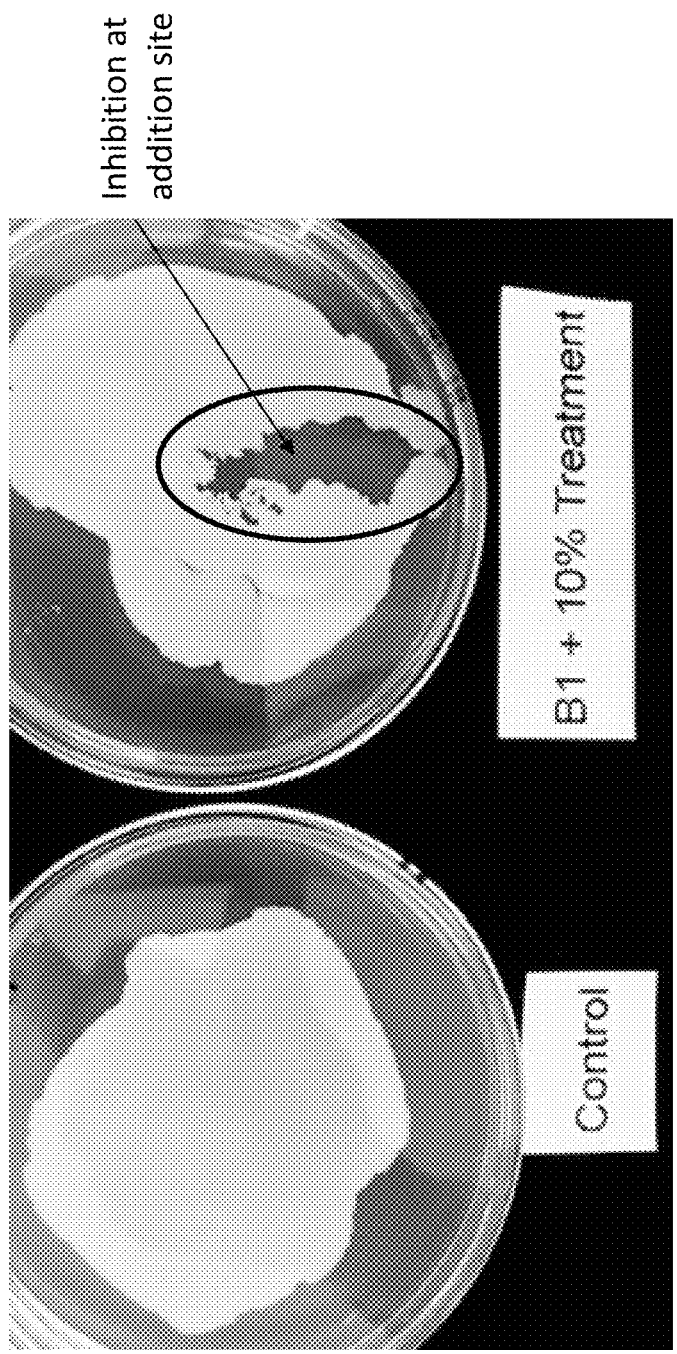

1, 5, and 10% v/v dilutions of a composition according to an embodiment of the subject invention were prepared using sterilized produced water from an Appalachian oil well as the solvent. 0.02 ml of each dilution (1, 5, and 10%) were added directly to the surface of the bacteria on their respective agar plates and were incubated at 35° C. for 24 hours. FIGS. 8A-8C show the treatment plates versus untreated controls. Bacterial growth inhibition was clear at the site of treatment application, with a greater area of inhibition corresponding to increasing percent volume of composition.

Example 10—Biofilm Disruption—Direct Contact with Composition

Figure 9A:
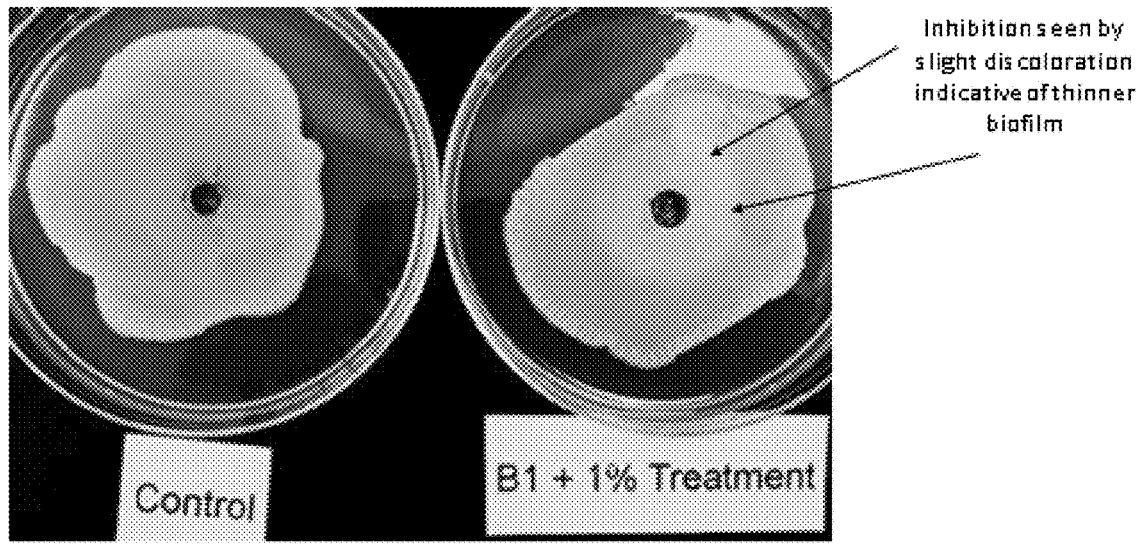
FIGS. 9A-9C show a comparison of biofilm formation inhibition with indirect treatment with 1% (A), 5% (B) and 10% v/v (C) dilutions of a composition according to one embodiment of the subject invention versus control, untreated biofilm. Indirect treatment involved removing a section of agar from a plate where bacterial culture was spread and dried, injecting the composition into the voided space in the agar, and allowing the composition to soak into the agar.
Figure 9B:
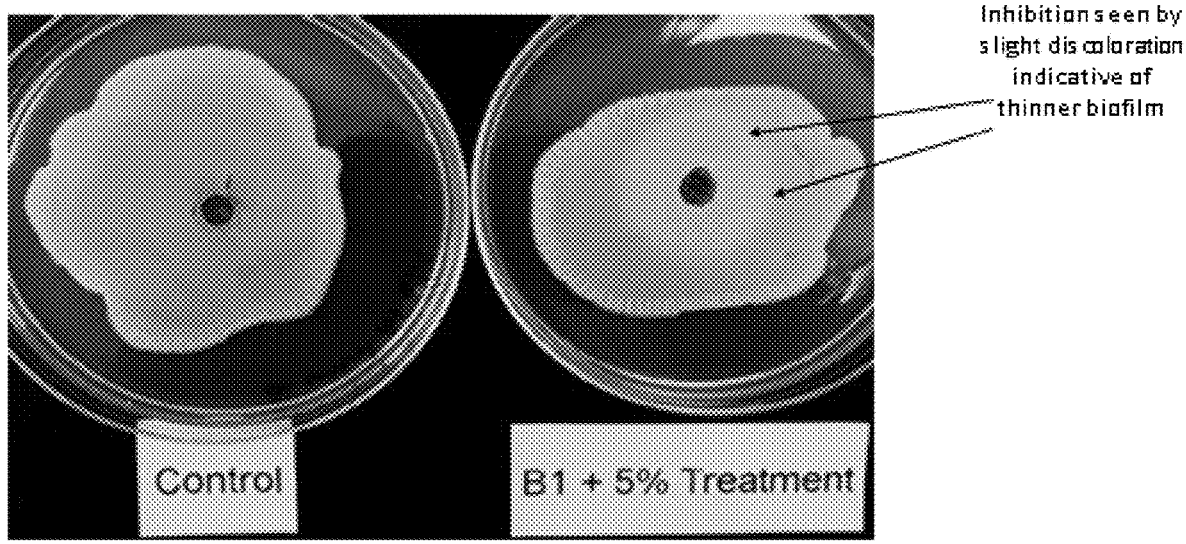
Figure 9C:
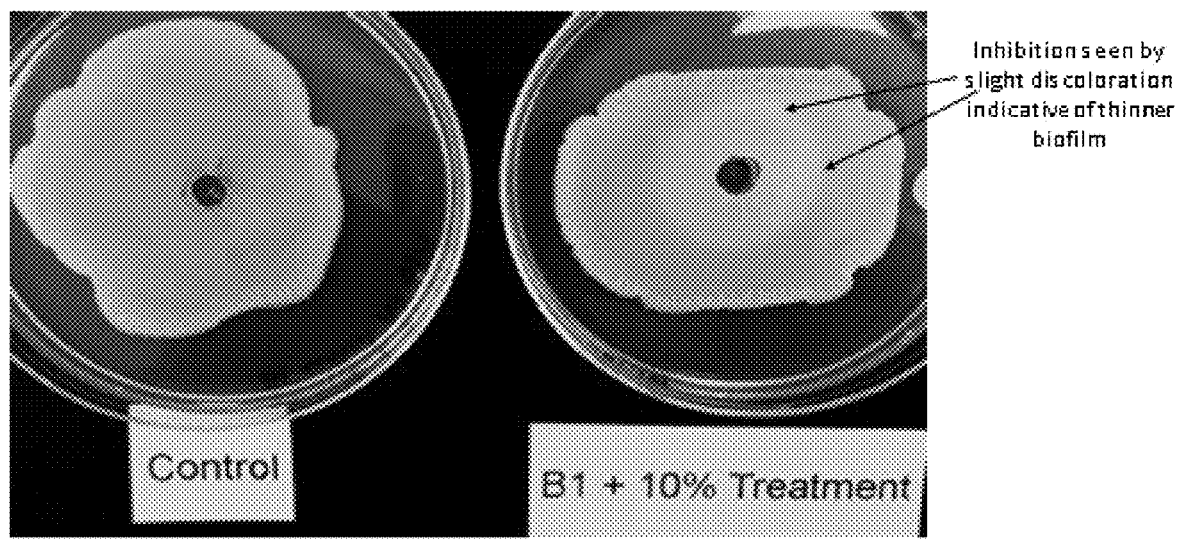

*B. subtilis subtilis* was allowed to cultivate and form a biofilm after 24 hours of incubation at 35° C. on a nutrient agar plate. Once the biofilm was established, 0.05 ml of a composition according to an embodiment of the subject invention was directly added to the surface of the biofilm at the center of the agar plate to test for biofilm degradation. As shown in FIGS. 9A-9B, initial signs of biofilm degradation were observed within 16 hours.

Example 11—Biofilm Disruption—Indirect Contact with Composition

The effects of the composition on biofilm formation were tested by indirect contact. *B. subtilis subtilis* was spread onto 4 agar plates. Once the spread was visibly dry, a piece of agar was removed from the center of each agar plate and a composition according to an embodiment of the subject invention was added to the "well" that was created. The treatment soaked into the surrounding agar.

Figure 10A:
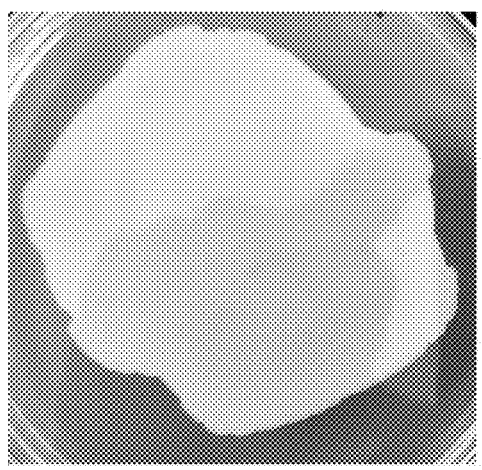
FIGS. 10A-10B show the effect of a composition according to one embodiment of the subject invention on disrupting established biofilm (B) versus untreated control (A). Within 16 hours of treatment, the initial signs of biofilm degradation could be observed.
Figure 10B:
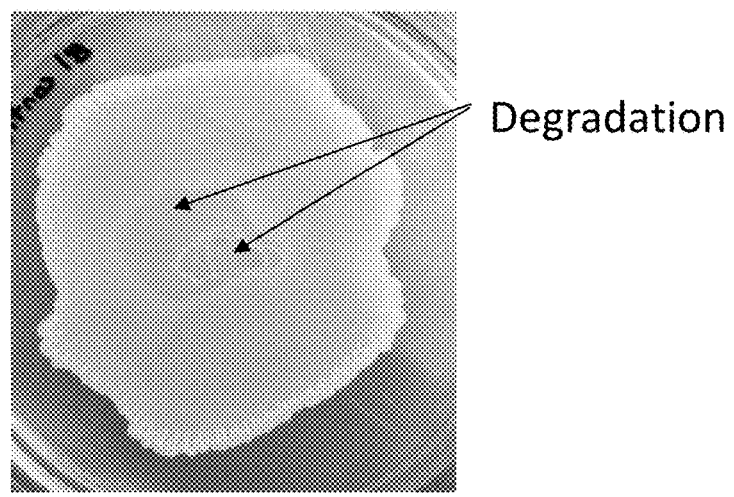

FIGS. 10A-10C show the treatment plates versus untreated controls. A circular area of thinning biofilm was observed around the agar well where treatment had soaked into the agar.

We claim:

1. A method for improving oil and/or gas production comprising applying to a subterranean formation, an oil and/or gas well, a wellbore and/or equipment associated therewith,
   one or more solvents, at least one of which is isopropyl alcohol,
   a sophorolipid, and
   sodium citrate as a chelator,
   wherein the equipment comprises a pipe line, storage tank, casing, tubing, rod, and/or pump.

2. The method of claim 1, used to remove a contaminant from the formation, well, wellbore and/or equipment while enhancing oil recovery,
   wherein the contaminant is a solid paraffin deposit and/or a paraffin precipitate,
   wherein the deposit and/or precipitate comprises paraffin molecules having carbon chain lengths of 20 or greater, and
   wherein the composition dissolves and/or liquefies the contaminant.

3. The method of claim 1, used to disperse and/or emulsify a solid paraffin deposit and/or a paraffin precipitate into crude oil fluids,
   wherein the deposit and/or precipitate comprises paraffin molecules having carbon chain lengths of 20 or greater.

4. The method of claim 1, used to inhibit crystallization of paraffin dispersed in crude oil.

5. The method of claim 1, used to prevent deposition of dispersed paraffin crystals onto surfaces of the subterranean formation, oil and/or gas well, wellbore and/or equipment.

6. The method of claim 1, used to reduce the viscosity of paraffinic crude oil.

7. The method of claim 1, used to reduce the pour point of paraffinic crude oil to about −25° F./−32° C.

8. The method of claim 1, used to remove and/or dissolve scale deposits on surfaces of the subterranean formation, oil and/or gas well, wellbore and/or equipment.

9. The method of claim 1, used to release rust from oilfield casings and related equipment and to protect against under-deposit rust-related corrosion of the equipment.

10. The method of claim 1, used to inhibit bacterial growth and disrupt biofilm formation on surfaces of the subterranean formation, oil and/or gas well, wellbore and/or equipment.

11. The method of claim 10, used to protect against microbial induced corrosion (MIC).

12. The method of claim 1, used to remediate formation skin damage, wherein the composition increases the permeability of near-wellbore fat illation by dissolving paraffin matrices in formation pores, and wherein the composition alters the wettability of the near-wellbore formation so that it is water-wet.

13. The method of claim 1, wherein the well is an offshore well.

14. The method of claim 1, wherein the method is used in oil wells with formation water salinity of 250,000 ppm (total dissolved solids) or more.

15. The method of claim 1, wherein the solvent, sophorolipid and chelator are applied in a single composition.

16. The method of claim 15, wherein the composition comprises 10 ml/L to 200 ml/L of isopropyl alcohol and 10 ml/L to 200 ml/L of sophorolipid.

* * * * *